United States Patent [19]
Mitsutani

[11] Patent Number: 5,948,974
[45] Date of Patent: Sep. 7, 1999

[54] DEVICE FOR DETERMINING DETERIORATION OF A CATALYTIC CONVERTER FOR AN ENGINE

[75] Inventor: Noritake Mitsutani, Toyota, Japan

[73] Assignee: Toyota Jidosha Kabushiki Kaisha, Toyota, Japan

[21] Appl. No.: 09/060,304

[22] Filed: Apr. 15, 1998

[30] Foreign Application Priority Data

May 12, 1997 [JP] Japan ..................................... 9-121011

[51] Int. Cl.⁶ .............................. F01N 3/20; F02D 41/14; F02D 45/00; G01M 15/00
[52] U.S. Cl. .......................... 73/118.1; 73/23.31; 60/276; 701/109
[58] Field of Search ................................... 73/116, 117.2, 73/117.3, 118.1, 23.31, 23.32; 60/276, 277; 701/101, 109

[56] References Cited

U.S. PATENT DOCUMENTS

| | | |
|---|---|---|
| 5,134,847 | 8/1992 | Ogawa et al. . |
| 5,435,172 | 7/1995 | Pelters et al. .............................. 60/277 |
| 5,513,522 | 5/1996 | Seki et al. ............................... 73/118.1 |
| 5,526,643 | 6/1996 | Mukaihira et al. ..................... 73/118.1 |
| 5,526,798 | 6/1996 | Seki ........................................ 73/118.1 |
| 5,591,905 | 1/1997 | Fujimoto et al. ....................... 73/118.1 |
| 5,595,061 | 1/1997 | Toyoda . |
| 5,602,737 | 2/1997 | Sindano et al. . |
| 5,610,321 | 3/1997 | Shinmoto . |
| 5,684,248 | 11/1997 | Iwata ....................................... 73/23.32 |
| 5,724,809 | 3/1998 | Mitsutani et al. . |
| 5,769,063 | 6/1998 | Mizusawa ............................... 73/118.1 |

FOREIGN PATENT DOCUMENTS

A-8-100637  4/1996  Japan .

*Primary Examiner*—George Dombroske
*Attorney, Agent, or Firm*—Oliff & Berridge, PLC

[57] ABSTRACT

The device for determining deterioration of a catalytic converter includes a catalytic converter disposed in the exhaust gas passage of the engine and an air-fuel ratio sensor disposed on the exhaust gas passage downstream of the catalytic converter. The device performs two types of determining operations based on the length of the output response curve of the downstream air-fuel ratio sensor, one is a deterioration determining operation which determines whether the catalytic converter has deteriorated and the other is a normal determining operation which determines whether the catalytic converter is normal. The device also estimates the temperature of the catalytic converter based on the operating condition of the engine, and sets a deterioration diagnosis intake air flow range and a normal diagnosis intake air flow range in accordance with the estimated temperature of the catalytic converter. The device performs the deterioration determining operation or the normal determining operation in accordance with whether the intake air flow rate of the engine is within the deterioration diagnosis range or the normal diagnosis range.

5 Claims, 17 Drawing Sheets

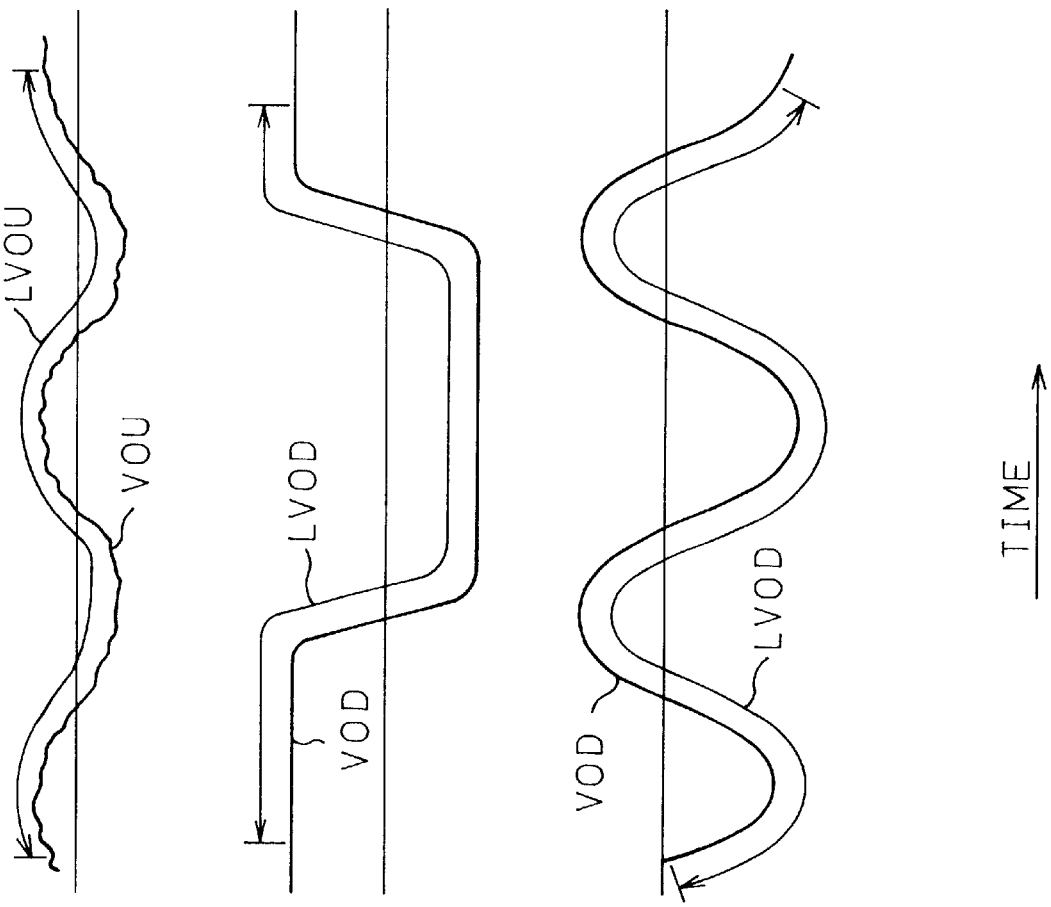

DEVICE FOR DETERMINING DETERIORATION OF A CATALYTIC CONVERTER FOR AN ENGINE

BACKGROUND OF THE INVENTION

1. Field of the Invention

The present invention relates to a device for determining deterioration of a catalytic converter for an engine.

2. Description of the Related Art

A device for determining deterioration of a catalytic converter based on the output signal of air-fuel ratio sensor disposed in an exhaust gas passage downstream of a catalytic converter of an engine is known in the art.

The device of this type is, for example, disclosed in Japanese Unexamined Patent Publication (Kokai) No. 8-338232.

The device in the '232 publication is provided with a means for determining deterioration of the catalytic converter based on a length of the output response curve of the downstream air-fuel ratio sensor. The device performs the determining operation only when a predetermined diagnostic condition is satisfied. The diagnostic condition in the '232 publication is that the flow rate of intake air drawn into the engine is between an upper limit and a lower limit. Further, the device in the '232 publication estimates the temperature of the catalytic converter and determines the upper and the lower limits of the intake air flow rate in accordance with the estimated temperature.

A three-way catalytic converter usually has an $O_2$ storage capability, i.e., a capability for absorbing oxygen in the exhaust gas when the air-fuel ratio of the exhaust gas flowing into the catalytic converter is lean compared to the stoichiometric air-fuel ratio and for releasing the absorbed oxygen when the air-fuel ratio of the exhaust gas flowing into the catalytic converter is rich compared to the stoichiometric air-fuel ratio. Due to this $O_2$ storage capability, the air-fuel ratio of the exhaust gas flowing out from the catalytic converter is kept near the stoichiometric air-fuel ratio even when the air-fuel ratio of the exhaust gas flowing into the catalytic converter fluctuates between a rich air-fuel ratio and a lean air-fuel ratio. Therefore, if the catalytic converter has not deteriorated, the fluctuation of the air-fuel ratio of the exhaust gas upstream of the catalytic converter is smoothed by the catalytic converter and, thereby, the air-fuel ratio of the exhaust gas downstream of the catalytic converter fluctuates with a relatively small amplitude and with a relatively low frequency. When the air-fuel ratio of the exhaust gas downstream of the catalytic converter fluctuates with a small amplitude and with a low frequency, the length of the output response curve of the downstream air-fuel ratio sensor becomes short.

However, since the $O_2$ storage capability of the catalytic converter decreases as deterioration of the catalytic converter proceeds, the amount of oxygen absorbed and released by the catalytic converter becomes small when the catalytic converter has deteriorated. Therefore, if the catalytic converter has deteriorated, the air-fuel ratio of the exhaust gas downstream of the catalytic converter fluctuates in the manner similar to that of the air-fuel ratio in the exhaust gas upstream of the catalytic converter. Therefore, when the catalytic converter has deteriorated, the amplitude of the fluctuation of the air-fuel ratio of exhaust gas downstream of the catalytic converter becomes larger, and the frequency thereof becomes higher. This causes an increase in the length of the output response curve of the downstream air-fuel ratio sensor. Therefore, a degree of deterioration of the catalytic converter can be determined by monitoring the length of the output response curve of the downstream air-fuel ratio sensor.

However, the $O_2$ storage capability changes in accordance with the temperature of the catalytic converter as well as the deterioration thereof. Further, in some cases, the fluctuation of the air-fuel ratio of the exhaust gas downstream of the catalytic converter changes in accordance with the flow rate of the exhaust gas even if the $O_2$ storage capability is the same. Namely, since the amount of oxygen absorbed and released per unit time in the $O_2$ storage operation of the catalytic converter changes in accordance with the flow rate of the exhaust gas, the catalytic converter releases all the oxygen in a short time even though the catalytic converter is normal when the exhaust gas is at a rich air-fuel ratio and the flow rate thereof is excessively large. Similarly, the catalytic converter absorbs oxygen to its maximum capacity in a short time even though the catalytic converter is normal when the exhaust gas is at a lean air-fuel ratio and the flow rate thereof is excessively large.

Therefore, if the determining operation of the deterioration of a catalytic converter is performed when the exhaust gas flow rate is excessively large, i.e., larger than an allowable flow range determined by the $O_2$ storage capability, the amplitude of the fluctuation of the air-fuel ratio of the exhaust gas downstream of the catalytic converter becomes large even though the catalytic converter is normal, and a normal catalytic converter may be determined incorrectly as having deteriorated.

On the other hand, if the exhaust gas flow rate is excessively small compared with the $O_2$ storage capability of the catalytic converter, the amount of oxygen absorbed and released per unit time in the $O_2$ storage operation, the amplitude of the fluctuation of the air-fuel ratio of the exhaust gas downstream of the catalytic converter becomes small even if the catalytic converter has deteriorated. Therefore, if the determining operation of the deterioration of a catalytic converter is performed when the exhaust gas flow rate is smaller than the allowable flow range, a deteriorated catalytic converter may be incorrectly determined as being normal.

Therefore, in order to prevent a normal catalytic converter from being determined as having deteriorated, it is necessary to perform the determining operation in an exhaust gas flow range smaller than a certain upper limit value. Similarly, in order to prevent a deteriorated catalytic converter from being determined as being normal, it is necessary to perform the determining operation in an exhaust gas flow range larger than a certain lower limit value.

In addition to that, since the $O_2$ storage capability of a catalytic converter changes in accordance with the temperature of a catalytic converter, the above-noted upper limit and lower limit must be determined in accordance with the temperature of the catalytic converter.

In the device of the '232 publication, the upper limit and the lower limit of the exhaust gas flow rate (i.e., the intake air flow rate) are set in accordance with the temperature of the catalytic converter. The upper limit of the intake air flow rate is a maximum intake air flow rate in the range where a normal catalytic converter is never determined as having deteriorated and, the lower limit of the intake air flow rate is a minimum flow rate in the range where a deteriorated catalytic converter is never determined as being normal. The device estimates the catalytic converter based on the operating conditions during the engine operation, and performs the determining operation which determines whether the catalytic converter is normal or has deteriorated only when the intake air flow rate is between the above-noted upper limit and the lower limit. In this way, the device in the '232 publication eliminates the possibility of an incorrect determination of the deterioration of the catalytic converter.

However, according to the device of the '232 publication, the opportunity for performing the determining operation during the engine operation becomes small since the intake air flow rate range where the determining operation is performed is narrow. As explained above, the upper limit of intake air flow rate in the device of the '232 publication is set at the maximum intake air flow rate where a normal catalytic converter is never incorrectly determined as being deteriorated. From a practical point of view, a catalytic converter can be used even if it has deteriorated to a certain degree as long as it still has a catalytic ability sufficient for the engine operation. Therefore, it is necessary to prevent a catalytic converter in which the degree of deterioration is acceptable for the engine operation from being determined as having deteriorated. Therefore, the upper limit of the intake air flow rate in the device of the '232publication must be determined using a catalytic converter having a maximum degree of deterioration within the acceptable deterioration range because, if the determining operation is performed in the intake air flow range larger than the value determined by the catalytic converter having the maximum acceptable degree of deterioration, some catalytic converters having an acceptable degree of deterioration may be determined as having deteriorated. Therefore, the upper limits in the device of the '232 publication at the respective temperatures are set at substantially small values compared to the upper limits of the catalytic converter not deteriorated at all.

Similarly, the lower limit of the intake air flow rate is set at a minimum intake air flow rate where a catalytic converter having an unacceptable degree of deterioration is never determined as being normal. Therefore, the lower limit must be determined using a catalytic converter having a minimum degree of deterioration within the unacceptable range of deterioration, since if the determining operation is performed in the intake air flow range smaller than the lower limit determined by the catalytic converter having the minimum degree of deterioration within the unacceptable range, some catalytic converters having an unacceptable degree of deterioration may be determined as being normal. Therefore, the lower limit in the device of the '232 publication at the respective temperatures are set at substantially large values compared to the lower limit of a catalytic converter which has deteriorated completely.

As explained above, in the device of the '232 publication, the upper limit of the intake air flow rate must be set at a small value and the lower limit of the intake air flow rate must be set at a large value. Thus, the range of intake air flow rate where the determining operation is allowed becomes considerably narrow in the device of the '232 publication. Therefore, the opportunity for performing the determining operation of the catalytic converter during the engine operation becomes relatively small in the device of the '232publication, and the detection of the deterioration of the catalytic converter may be delayed.

SUMMARY OF THE INVENTION

In view of the problems in the related art as set forth above, the object of the present invention is to provide a device for determining the deterioration of the catalytic converter which is capable of correctly determining the deterioration of the catalytic converter without reducing the opportunity of performing the determining operation of the deterioration.

This object is achieved by a device, for determining deterioration of a catalytic converter having an $O_2$storage capability and disposed in an exhaust gas passage of an engine, comprising a downstream air-fuel ratio sensor disposed in the exhaust gas passage of the engine downstream of the catalytic converter for detecting the air-fuel ratio of the exhaust gas downstream of the catalytic converter, air-fuel ratio control means for controlling an operating air-fuel ratio of the engine at a target air-fuel ratio, condition determining means for determining whether a condition for determining the deterioration of the catalytic converter is satisfied when the air-fuel ratio control means controls the operating air-fuel ratio of the engine, a determining means which determines the deterioration of the catalytic converter when the condition is satisfied, characterized in that the condition for determining the deterioration of the catalytic converter comprises a first condition for performing a deterioration determining operation which determines whether the catalytic converter has deteriorated and a second condition for performing a normal determining operation which determines whether the catalytic converter is normal and the condition determining means separately determines whether the first and the second conditions are satisfied and the determining means comprises a deterioration determining means for performing the deterioration determining operation based on an output of the downstream air-fuel ratio sensor when the first condition is satisfied and a normal determining means for performing the normal determining operation based on the output of the downstream air-fuel ratio sensor when the second condition is satisfied.

According to this aspect of the present invention, the determining means separately performs the deterioration determining operation which determines whether the catalytic converter has deteriorated and the normal determining operation which determines whether the catalytic converter is normal. When the condition for determining whether the catalytic converter has deteriorated is satisfied, i.e., when the condition where a normal catalytic converter (i.e., a catalytic converter in which the degree of deterioration is within an acceptable range) is never determined as having deteriorated is satisfied (for example, when the intake air flow rate is smaller than a predetermined upper limit), the determining means performs the deterioration determining operation. In the deterioration determining operation, the determining means determines only whether the catalytic converter has deteriorated and does not determines whether the catalytic converter is normal. Since the deterioration determining operation is performed in the condition where a normal catalytic converter is never determined as being deteriorated, only a catalytic converter actually having deteriorated to an unacceptable degree is determined as being deteriorated. Further, since the deterioration determining operation does not determine whether the catalytic converter is normal, the catalytic converter deteriorated to unacceptable degree is never determined as being normal.

Similarly, when the condition where a deteriorated catalytic converter (i.e., a catalytic converter having deteriorated to an unacceptable degree) is never determined as being normal is satisfied (for example, when the intake air flow rate is larger than a predetermined lower limit), the determining means performs the normal determining operation. In the normal determining operation, the determining means determines only whether the catalytic converter is normal and does not determines whether the catalytic converter has deteriorated. Since the normal determining operation is performed in the condition where a deteriorated catalytic converter is never determined as being normal, only a catalytic converter in which the degree of deterioration is within an acceptable range is determined as being normal. Further, since the normal determining operation does not determine whether the catalytic converter has deteriorated, the catalytic converter in which the degree of deterioration is within an acceptable range is never determined as having deteriorated.

Therefore, according to the present aspect of the invention, the possibility of incorrect determinations in which a normal catalytic converter is determined as having deteriorated or a deteriorated catalytic converter is determined as being normal is completely eliminated.

Further, the determining operation can be performed either of the condition for performing the normal determining operation and the condition for performing the deterioration determining operation is satisfied, i.e., it is not required that the both conditions are satisfied simultaneously, the opportunity for performing the determining operation during the engine operation greatly increases.

According to another aspect of the present invention, there is provided a device for determining deterioration of a catalytic converter having an $O_2$ storage capability and disposed in an exhaust gas passage of an engine which comprises a downstream air-fuel ratio sensor disposed in the exhaust gas passage of the engine downstream of the catalytic converter for detecting the air-fuel ratio of the exhaust gas downstream of the catalytic converter, air-fuel ratio control means for controlling an operating air-fuel ratio of the engine at a target air-fuel ratio, determining means for determining whether the catalytic converter has deteriorated based on an output of the downstream air-fuel ratio sensor when the air-fuel ratio control means controls the operating air-fuel ratio of the engine and the flow rate of intake air drawn into the engine is between a predetermined upper and lower limits, characterized in that the device further comprises normal temperature estimating means for estimating the temperature of the catalytic converter, on the assumption that the catalytic converter is normal, based on an intake air flow rate of the engine, deteriorated temperature estimating means for estimating the temperature of the catalytic converter, on the assumption that the catalytic converter has deteriorated, based on the intake air flow rate of the engine and limit value setting means for setting the upper limit of the intake air flow rate in accordance with the temperature estimated by the normal temperature estimating means and for setting the lower limit of the intake air flow rate in accordance with the temperature estimated by the deteriorated temperature estimating means.

In this aspect of the invention, the determining operation of the deterioration of the catalytic converter is performed when the intake air flow rate is within the range between the upper limit and the lower limit. The upper limit is a maximum intake air flow rate in the flow range where a normal catalytic converter is never determined as having deteriorated, and the lower limit is a minimum intake air flow rate in the flow range where a deteriorated catalytic converter is never determined as being normal. The upper limit of intake air flow rate is determined in accordance with the temperature of the catalytic converter estimated on the assumption that the catalytic converter is normal, and the lower limit of the intake air flow rate is determined in accordance with the temperature of the catalytic converter estimated on the assumption that the catalytic converter has deteriorated.

The temperature of the catalytic converter becomes lower as the deterioration of the catalytic converter proceeds even if the intake air flow rate is the same. Therefore, when the temperature of the catalytic converter is estimated based on the intake air flow rate assuming that the catalytic converter is normal, the estimated temperature of a catalytic converter becomes higher than an actual temperature if the catalytic converter has deteriorated. Therefore, when the lower limit of intake air flow rate is determined using the estimated temperature, based on the normal catalytic converter, the determined lower limit becomes larger than the value actually required for a deteriorated catalytic converter. This causes the range of the intake air flow rate for performing the determining operation to be narrowed unnecessarily, and the frequency for performing the determining operation may decreases.

On the other hand, when the temperature of the catalytic converter is estimated on the assumption that the catalytic converter has deteriorated, the estimated temperature of the catalytic converter becomes lower than the actual temperature, if the catalytic converter is normal. In this case, when the upper limit of the intake air flow rate is determined using the temperature estimated on the assumption that the catalytic converter has deteriorated, the upper limit for a normal catalytic converter becomes smaller than the value actually required. This also causes the range of the intake air flow rate for performing the determining operation to be narrowed unnecessarily.

In this aspect of the invention, since the upper limit of the intake air flow range for performing the determining operation, i.e., a maximum intake air flow rate where a normal catalytic converter is never determined as having deteriorated is set in accordance with the temperature of the catalytic converter estimated on the assumption that the catalytic converter is normal. Further, the lower limit of the intake air flow range, i.e., a minimum intake air flow rate where a deteriorated catalytic converter is never determined as being normal, is set in accordance with the temperature of the catalytic converter estimated on the assumption that the catalytic converter has deteriorated. Therefore, the upper limit is set at a larger value and the lower limit is set at a smaller value and, thereby, the intake air flow range where the determining operation is performed is not narrowed. Therefore, the opportunity for performing the determining operation increases without lowering the accuracy of the determination.

BRIEF DESCRIPTION OF THE DRAWINGS

The present invention will be better understood from the description as set forth hereinafter, with reference to the accompanying drawings in which:

FIGS. 2A, 2B and 2C schematically illustrate the change in the output response curve of the downstream $O_2$ sensor in accordance with deterioration of the catalytic converter;

DESCRIPTION OF THE PREFERRED EMBODIMENT

Figure 1:
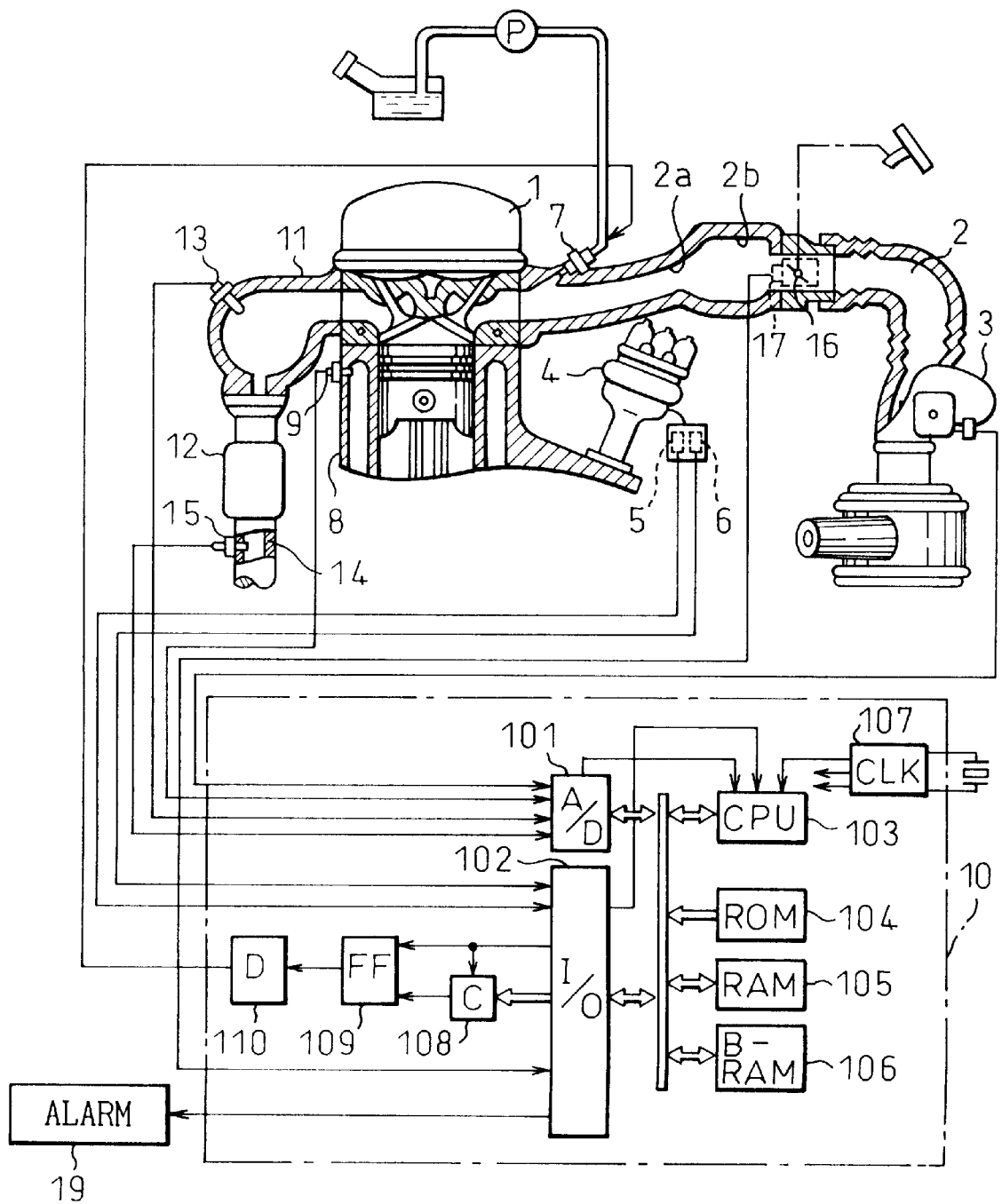
FIG. 1 schematically illustrates an embodiment of the present invention when applied to an automobile engine.

FIG. 1 schematically illustrates an embodiment of the device for determining the deterioration of the catalytic converter when the present invention is applied to an automobile engine.

In FIG. 1, reference numeral 1 represents an internal combustion engine for an automobile, 2a is an intake manifold connected to inlet ports of the respective cylinders of the engine 1. The intake manifold 2a connects an intake air passage 2 to the inlet ports of the respective cylinders of the engine 1 via a surge tank 2b. The intake air passage 2 is provided with a potentiometer-type airflow meter 3 for detecting the flow rate of intake air drawn into the engine 1. The airflow meter 3 generates an analog voltage signal which is proportional to the flow rate of air flowing therethrough. The signal from the airflow meter 3 is transmitted to a multiplexer-incorporating analog-to-digital (A/D) converter 101 of a control circuit 10. A throttle valve 16, operated by the vehicle driver, is provided in the intake air passage 2, together with an idle switch 17 for detecting the opening of the throttle valve and generating a signal ("LL signal") when the throttle valve 16 is fully closed. This LL signal is supplied to the I/O interface 102 of the control circuit 10.

In the intake manifold 2a, a fuel injection valve 7 is provided at the inlet port of each cylinder of the engine 1. The fuel injection valve 7 injects pressurized fuel from the fuel system into the inlet port of the respective cylinders in accordance with the signal from the control circuit 10.

In FIG. 1, numeral 11 designates an exhaust manifold connected to the exhaust port of the respective cylinders of the engine 1. The exhaust manifold 11 is connected to an exhaust passage 14. A three-way reducing and oxidizing catalytic converter 12 is disposed in the exhaust passage 14 downstream of the exhaust manifold 11. The catalytic converter 12 has an $O_2$ storage capacity and is capable of removing three pollutants in the exhaust gas, i.e., CO, HC and $NO_x$, at the same time when the air-fuel ratio of the exhaust gas flowing into the catalytic converter 12 is near a stoichiometric air-fuel ratio.

An upstream air-fuel ratio sensor 13 is provided at the exhaust manifold 11, i.e., upstream of the catalytic converter 12. In this embodiment, a linear air-fuel ratio sensor which generates a continuous voltage signal proportional to the air-fuel ratio of the exhaust gas is used as the upstream air-fuel ratio sensor 13.

A downstream air-fuel ratio sensor 15 is disposed at an exhaust passage 14 downstream of the catalytic converter 12. In this embodiment, an $O_2$ sensor which generates output signal corresponding to the concentration of oxygen in the exhaust gas is used for the downstream air-fuel ratio sensor 15. More specifically, the $O_2$ sensor 15 generates an output voltage signal that change in accordance with whether the air-fuel ratio of the exhaust gas is rich or lean compared to the stoichiometric air-fuel ratio. In this specification, the term "air-fuel ratio of the exhaust gas" means the ratio of the amounts of air and fuel supplied to the engine and exhaust gas passage upstream of a considered point. Therefore, if air or fuel is not supplied to the exhaust gas passage, the air-fuel ratio of the exhaust gas agrees with an operating air-fuel ratio of the engine (i.e., air-fuel ratio of the air-fuel mixture supplied to the engine). The signals from the sensors 13 and 15 are transmitted to the A/D converter 101 of the control circuit 10.

Crank angle sensors 5 and 6, for detecting the rotation angle of the crankshaft (not shown) of the engine 1, are disposed at a distributor 4 of the engine 1.

In this embodiment, the crank angle sensor 5 generates a reference pulse signal at every 720° crank angle (for example, when a cylinder stroke of a particular cylinder reaches a top dead center of a compression stroke), and the crank angle sensor 6 generates a rotation pulse signal at every 30° crank angle. The pulse signals from the crank angle sensors 5 and 6 are supplied to an input/output (I/O) interface 102 of the control circuit 10. Further, the pulse signal of the crank angle sensor 6 is then supplied to an interruption terminal of a central processing unit (CPU) 103.

A coolant temperature sensor 9 for detecting the temperature of the coolant is disposed in a water jacket of a cylinder block 8 of the engine 1. The coolant temperature sensor 9 generates an analog voltage signal in response to the temperature of the coolant, and transmits this signal to the A/D converter 101 of the control circuit 10.

The control circuit 10, which may consist of a microcomputer, further comprises a central processing unit (CPU) 103, a read-only-memory (ROM) 104 for storing a main routine and interrupt routines such as a fuel injection routine and an ignition timing routine, and constants, etc., a random-access-memory (RAM) 105 for storing temporary data, a backup RAM 106, and a clock generator 107 for generating various clock signals. The backup RAM 106 is directly connected to a battery (not shown), and therefore, the contents of the backup RAM 106 are preserved even when the main switch of the engine (not shown) is turned off.

Numeral 19 designates an alarm that is activated when the catalytic converter 12 is determined as being deteriorated.

A down counter 108, a flip-flop 109, and a drive circuit 110 are provided in the control circuit 10 for controlling the fuel injection valve 7.

When a fuel injection amount TAU is calculated in a fuel injection amount calculating operation (not shown), the amount TAU is preset in the down counter 108, and simultaneously, the flip-flop 109 is set, and as a result, the drive circuit 110 initiates the activation of the fuel injection valve 7. The down counter 108 counts up the clock signal from the clock generator 107, and finally, a logic 1 signal is generated from the terminal of the down counter 108, to reset the flip-flop 109, so that the drive circuit 110 stops the activation of the fuel injection valve 7, whereby an amount of fuel corresponding to the fuel injection amount TAU is supplied to the cylinders.

The intake air flow data Q from the airflow meter 3 and the coolant temperature data THW from the coolant sensor 9 are fetched by an A/D conversion operation(s) executed at predetermined intervals, and then stored in the RAM 105; i.e., the data Q and THW in the RAM 105 are updated at predetermined intervals. The engine speed Ne is calculated by an interruption routine executed at every 30° crank angle, i.e., at every pulse signal of the crank angle sensor 6, and is stored in the RAM 105.

In this embodiment, the control circuit 10 determines the fuel injection amount TAU based on the outputs of the sensors 13 and 15 in such a manner that the air-fuel ratio of the engine becomes a stoichiometric air-fuel ratio. Any known fuel injection control (air-fuel ratio control) can be used in this embodiment as long as the operating air-fuel ratio of the engine can be controlled at near the stoichiometric air-fuel ratio.

Next, the principal of the detection of deterioration of the catalytic converter in this embodiment is explained.

In this embodiment, deterioration of the catalytic converter is determined by detecting the deterioration of the $O_2$ storage capability of the catalytic converter. As explained before, the catalytic converter performs the $O_2$ storage operation which absorbs oxygen in the exhaust gas when the air-fuel ratio of the exhaust gas flowing into the catalytic converter is lean, and releases the absorbed oxygen when the air-fuel ratio of the exhaust gas flowing into the catalytic converter is rich. Due to this $O_2$ storage operation, the fluctuation of the air-fuel ratio of the exhaust gas flowing out from the catalytic converter becomes small even when the air-fuel ratio of the exhaust gas flowing into the catalytic converter fluctuates around the stoichiometric air-fuel ratio to a certain degree. Therefore, the catalytic ability of the catalytic converter can be fully utilized.

When the fluctuation of the air-fuel ratio of the exhaust gas downstream of the catalytic converter is kept small due to the $O_2$ storage capability, the length LVOD of the output response curve of the downstream $O_2$ sensor 15 becomes small compared to the length LVOU of the output response curve of the upstream air-fuel ratio sensor 13. Therefore, the ratio between LVOD and LVOU, i.e., LVOD/LVOU becomes a small value. However, as deterioration of the catalytic converter proceeds, the $O_2$ storage capability of the catalytic converter becomes low, and the fluctuation of the air-fuel ratio of the exhaust gas downstream of the catalytic converter increases and approaches to the fluctuation of the exhaust gas upstream of the catalytic converter. This causes the value of the ratio LVOD/LVOU to increase as the deterioration of the catalytic converter increases. Thus, the catalytic converter can be determined as having deteriorated when the ratio of the lengths LVOD/LVOU exceeds a certain threshold value.

FIGS. 2B and 2C illustrates the change in the output response curve of the downstream $O_2$ sensor 15 in accordance with the deterioration of the catalytic converter. FIG. 2A shows the output response curve of the upstream air-fuel ratio sensor 13. The air-fuel ratio of the exhaust gas upstream of the catalytic converter in this embodiment is controlled near the stoichiometric air-fuel ratio and fluctuates around the stoichiometric air-fuel ratio with a small amplitude, as seen from FIG. 2A. This causes the length LVOU of the response of the upstream air-fuel ratio sensor 13 to be a relatively small value.

FIG. 2B shows the response of the downstream $O_2$ sensor 15 when the catalytic converter has not deteriorated. When the catalytic converter has not deteriorated, the air-fuel ratio of the exhaust gas flowing out from the catalytic converter is kept near the stoichiometric air-fuel ratio. Since the $O_2$ sensor generates a signal which changes in accordance with whether the air-fuel ratio is lean or rich, the output of the downstream $O_2$ sensor 15 fluctuates between a rich output level and a lean output level with a relatively long intervals as shown in FIG. 2B. Therefore, the length LVOD of the output response curve of the downstream $O_2$ sensor 15 becomes very small when the catalytic converter has not deteriorated. In this case, the ratio of the length LVOD/LVOU becomes small.

FIG. 2C shows the output response curve of the downstream $O_2$ sensor 15 when the catalytic converter has deteriorated. When the catalytic converter has deteriorated, the air-fuel ratio of the exhaust gas downstream of the catalytic converter fluctuates in the manner same as that of the air-fuel ratio of the exhaust gas upstream of the catalytic converter. Therefore, the output of the downstream $O_2$ sensor 15 (FIG. 2C) fluctuates with a frequency near that of the upstream air-fuel ratio sensor 13 (FIG. 2A). Thus, the length LVOD of the output response curve of the downstream $O_2$ sensor 15 increases, and the value of the ratio LVOD/LVOU becomes large.

However, in order to determine the deterioration of the catalytic converter based on downstream $O_2$ sensor 15, it is necessary to perform the determining operation in the condition where the state of the deterioration of the catalytic converter clearly appears in the output of the downstream $O_2$ sensor 15. Since the fluctuation of the output of the downstream $O_2$ sensor 15 varies in accordance with various factors even if the degree of deterioration of the catalytic converter is the same, if the determination is performed in the condition where other factors affect the fluctuation of the output of the downstream $O_2$ sensor, an error occurs in the determination.

The major factors which affect the fluctuation of the output of the downstream $O_2$ sensor are, for example, the temperature of the catalytic converter and the flow rate of the exhaust gas.

Since the $O_2$ storage capability increases as the temperature of the catalytic converter becomes high, the fluctuation of the output of the downstream $O_2$ sensor becomes smaller (i.e., the ratio LVOD/LVOU becomes smaller) as the temperature of the catalytic converter becomes high. On the contrary, the ratio LVOD/LVOU becomes larger as the temperature of the catalytic converter becomes low.

Further, when the exhaust gas flow rate is large, the rate of releasing and absorbing oxygen by the catalytic converter increases. Therefore, if the exhaust gas flow rate is excessively large, the catalytic converter releases all the oxygen it has stored in a short time when the air-fuel ratio of the exhaust gas becomes rich, and absorbs oxygen to its maximum capacity in a short time when the air-fuel ratio of the exhaust gas becomes lean. Consequently, the fluctuation of the output of the downstream $O_2$ sensor becomes large as the exhaust gas flow rate becomes large. Thus, the value of the ratio LVOD/LVOU becomes large as the exhaust gas flow rate becomes large, and becomes small as the exhaust gas flow rate becomes small.

Figure 3A:
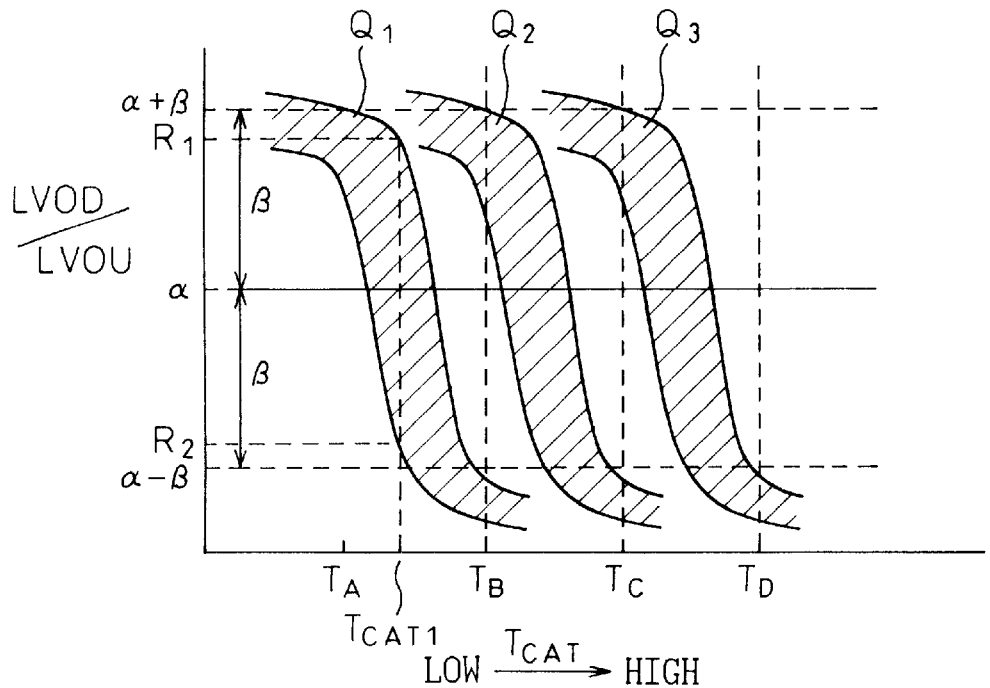
FIGS. 3A and 3B illustrate the change in the length of the output response curves of the downstream $O_2$ sensor in accordance with the temperature of the catalytic converter and the intake air flow rate of the engine when the catalytic converter is normal and has deteriorated.
Figure 3B:
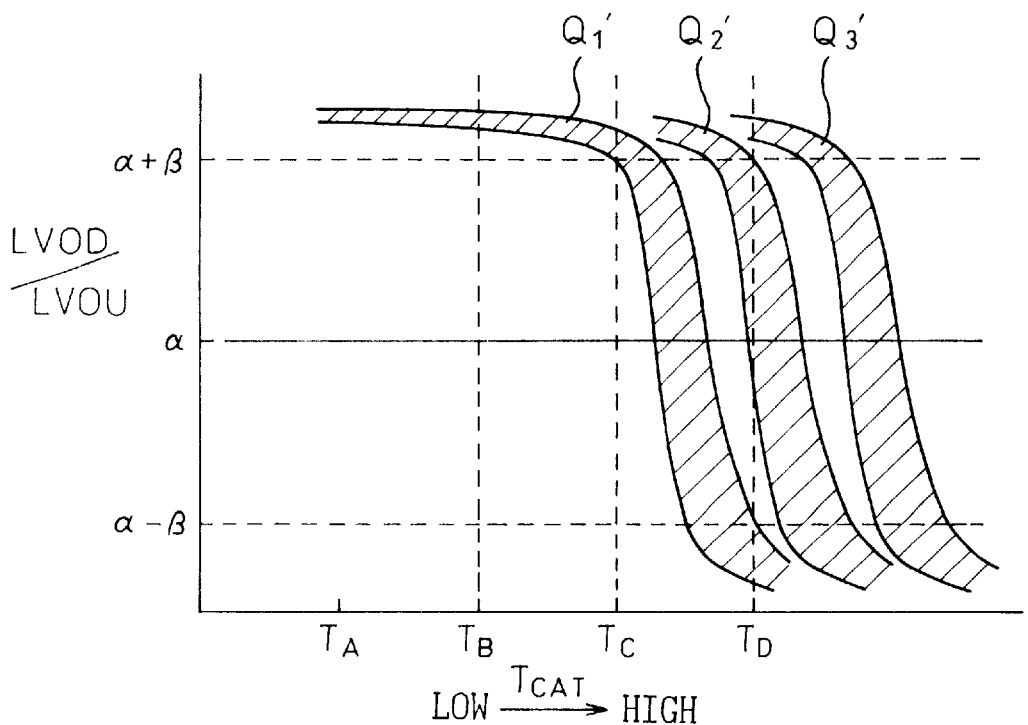

Further, it is found that the value LVOD/LVOU calculated from the actual outputs of the sensors 13 and 15 scatters widely even when the temperature of the catalytic converter 12 and the exhaust gas flow rate are kept constant. FIGS. 3A and 3B show the values LVOD/LVOU actually obtained by experiment using a normal catalytic converter (FIG. 3A) and a deteriorated catalytic converter (FIG. 3B). In FIGS. 3A and 3B, the value LVOD/LVOU is measured in a various conditions in which the flow rate Q of intake air (i.e., the exhaust gas flow rate) and the temperature $T_{cat}$ of the catalytic converter are changed. As seen from FIG. 3A (a normal catalytic converter), the ratio LVOD/LVOU changes largely (within the area shown by the hatched portion in FIG. 3A) even if the catalytic converter is the same when the flow rate Q ($Q_1<Q_2<Q_3$) or the temperature $T_{cat}$ changes. In addition to this, the value LVOD/LVOU scatters largely even when the Q and the $T_{cat}$ is kept at the same.

For example, referring to the case in FIG. 3A in which the flow rate is $Q_1$ and the temperature is $T_{cat}$, it is seen that the value LVOD/LVOU scatters between the maximum value R1 and the minimum value R2, and the maximum span of the scattering is approximately plus and minus $\beta$ with respect to the center value $\alpha$ of the scattering. The magnitude of scattering becomes smaller as the temperature $T_{cat}$ becomes higher. For example, as seen from FIG. 3A, when the flow rate is $Q_1$, the scattering of the value LVOD/LVOU becomes relatively small when the temperature $T_{cat}$ becomes higher than $T_B$. This is true for the cases in which the flow rate Q is larger than $Q_1$ (i.e., $Q=Q_2$ or $Q_3$). Namely, the magnitude of the scattering in the actual value of LVOD/LVOU changes depending on the combinations of the temperature $T_{cat}$ and the exhaust gas flow rate Q.

Considering the case in an ideal condition in which there is no scattering dispersion of the value LVOD/LVOU. In this case, assume that the catalytic converter is determined as being normal when the ratio LVOD/LVOU is smaller than, for example, $\alpha$. However, if the determining operation is performed when the flow rate is $Q_1$, even if the measured value of LVOD/LVOU is equal to the threshold $\alpha$, in the actual determining operation, the true value of the ratio LVOD/LVOU may be somewhere between $\alpha-\beta$ and $\alpha+\beta$, since the actual value of the ratio LVOD/LVOU scattering $\pm\beta$ at maximum, as shown in FIG. 3A. Therefore, it is necessary to set the conditions for determining the deterioration considering the scattering of the measured ratio LVOD/LVOU.

Namely, in order to always determine the normal catalytic converter as being normal, it is necessary to perform the determining operation at the combination of the temperature $T_{cat}$ and the flow rate Q where the measured value LVOD/LVOU of a normal catalytic converter always becomes less than $\alpha-\beta$, i.e., the threshold value $\alpha$ minus maximum magnitude of scattering $\beta$). If the determination of the deterioration is carried out in other conditions, a normal catalytic converter may be incorrectly determined as being deteriorated. (For example, if the determination is carried out in the condition in which the temperature is $T_{cat}$ and the flow rate is $Q_1$ in FIG. 3, the measured value of LVOD/LVOU of a normal catalytic converter can be anywhere between $R_1$, and $R_2$, and the LVOD/LVOU can be larger than the threshold value $\alpha$ even if the catalytic converter is normal). Considering this condition, the combination of $T_{cat}$ and Q which always determines the normal catalytic converter as being normal is, for example, the flow rate Q is smaller than $Q_3$ if the temperature $T_{cat}$ is $T_D$ in FIG. 3A. Since the value LVOD/LVOU of a normal catalytic converter always becomes smaller than $\alpha-\beta$ in this condition, a normal catalytic converter is always determined as being normal even though the measured value of LVOD/LVOU scatters $\pm\beta$ at maximum. Similarly to this, when the temperature $T_{cat}$ is $T_c$, the flow rate must be smaller than $Q_2$, and when the temperature $T_{cat}$ is $T_B$, the flow rate must be smaller than $Q_1$, to always determine a normal catalytic converter as being normal.

Next, the combinations of $T_{cat}$ and Q in which a deteriorated catalytic converter is always determined as having deteriorated is considered with reference to FIG. 3B. FIG. 3B is a diagram similar to FIG. 3A illustrating the measured ratio LVOD/LVOU of a deteriorated catalytic converter in the various conditions of Q and $T_{cat}$. In FIG. 3B, the relationships between the flow rates $Q_1$, $Q_2$, $Q_3$ in FIG. 3A and $Q_1'$, $Q_2'$, $Q_3'$ in FIG. 3B are $Q_1'<Q_2'<Q_1<Q_3<Q_2<Q_3$. It will be understood from FIGS. 3A and 3B that the range of the $T_{cat}$ and Q in which the ratio LVOD/LVOU becomes small, shifts to high temperature side and large flow rate side when a catalytic converter has deteriorated. In order to determine a deteriorated catalytic converter always as having deteriorated, it is necessary to perform the determining operation in the conditions where the ratio LVOD/LVOU of a deteriorated catalytic converter always becomes larger than the threshold value even if the scattering of the measured value LVOD/LVOU exists (in this case, the value LVOD/LVOU of a deteriorated catalytic converter must be always larger than a $\alpha+\beta$, considering the scattering $\beta$). As seen from FIG. 3B, these conditions are, the flow rate larger than $Q_3'$ when the temperature is $T_D$, the flow rate larger than $Q_2'$ when the temperature is $T_c$, and the flow rate larger than $Q_1'$ when the temperature is $T_b$.

Figure 4:
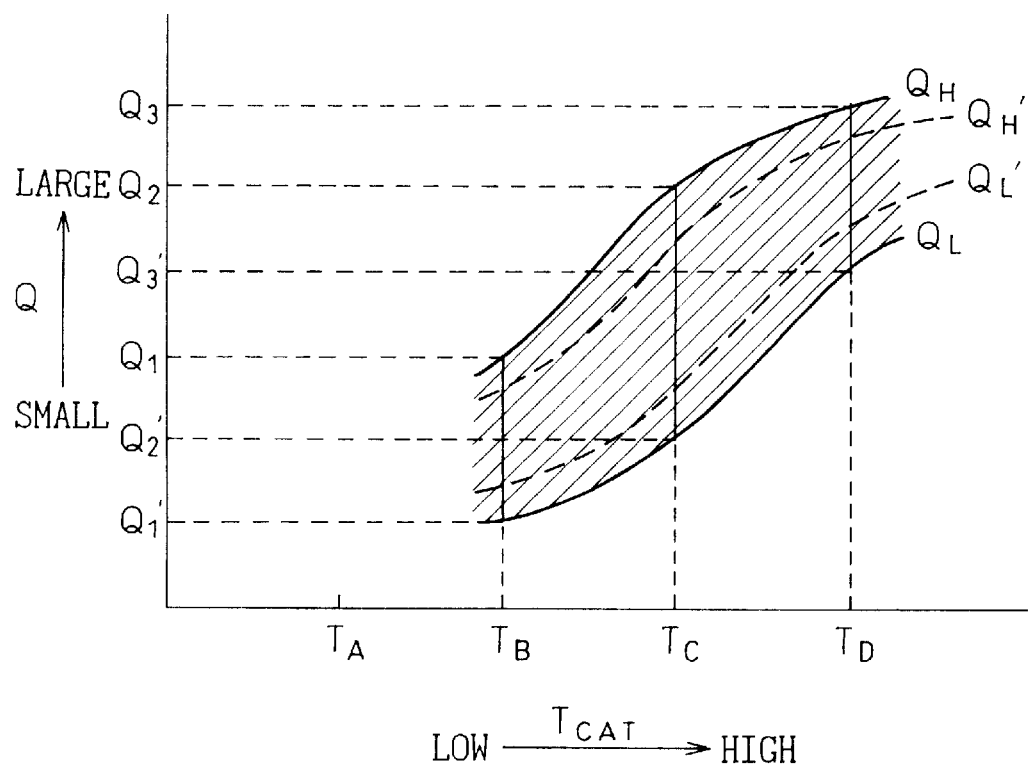
FIG. 4 illustrates a relationship between the temperature of the catalytic converter and the range of the intake air flow rate where the deterioration determining operation is performed.

FIG. 4 shows the flow rates determined by FIGS. 3A and 3B. In FIG. 4, the line $Q_H$ shows the maximum flow rate of the exhaust gas at the respective temperatures of the catalytic converter where a normal catalytic converter is always determined as being normal and, the line $Q_L$ shows the minimum flow rate of the exhaust gas at the respective temperatures where a deteriorated catalytic converter is always determined as having deteriorated. For example, when the temperature $T_{cat}$ of the catalytic converter is $T_C$, the flow rate of the exhaust gas must be smaller than the upper limit $Q_2$ in order to determine a normal catalytic converter always as being normal, and must be larger than the lower limit $Q_2'$ in order to determine a deteriorated catalytic converter always as having deteriorated.

The conditions for performing the determining operation of deterioration of the catalytic converter in this embodiment will be explained.

As explained above, the line $Q_H$ in FIG. 4 represents the upper limit of exhaust gas (intake air) flow rate in order to allow a normal catalytic converter to be always determined as being normal, and the line $Q_L$ represents the lower limit of exhaust gas (intake air) flow rate to allow a deteriorated catalytic converter to be always determined as having deteriorated. Therefore, if the determining operation is performed when the intake air flow rate is between $Q_H$ and $Q_L$ at the respective temperatures, the deterioration of the catalytic converter can be correctly determined. However, as explained before, the upper limit $Q_H$ must be determined using a catalytic converter deteriorated to the maximum degree within an acceptable range of deterioration. It is understood from FIGS. 3A and 3B that the upper limit of the exhaust gas flow rate shifts in the direction to higher temperatures when the catalytic converter has deteriorated. Therefore, if the upper limit of the exhaust gas flow rate is determined using the catalytic converter deteriorated to the maximum degree within the acceptable deterioration range, the determined upper limits $Q_H'$ becomes a similar curve as $Q_H$ in FIG. 4, but shifts in the direction to higher temperatures. Therefore, when the temperature is the same, the upper limit $Q_H'$ of the catalytic converter deteriorated to the limit of the allowable range becomes smaller than the upper limit $Q_H$ of completely normal catalytic converter.

Similarly, since the lower limit must be determined in such a manner that even a catalytic converter in which the degree of deterioration slightly exceeds the acceptable limit is always determined as having deteriorated, the lower limit must be determined using a catalytic converter deteriorated to the level slightly higher than the acceptable limit of deterioration (i.e., a catalytic converter which deteriorated to a minimum level of deterioration within the unacceptable range of deterioration). Therefore, in this case, the lower limits $Q_L'$ at the respective temperatures becomes larger compared to the lower limits $Q_L$ of a completely deteriorated catalytic converter, as shown in FIG. 4.

Therefore, if the determining operation is performed when both the conditions of the flow rate (1) where a catalytic converter having an acceptable degree of deterioration is always determined as being normal (i.e., $Q<Q_H'$) and, (2) where a catalytic converter having an unacceptable degree of deterioration is always determined as having deteriorated (i.e., $Q>Q_L'$) must be satisfied, the determining operation can be performed only when the flow rate Q is between $Q_L'$ and $Q_H'$ in FIG. 4. This makes the opportunity for the determining operation during the engine operation considerably small and, in some cases, the detection of deterioration is delayed.

Therefore, in order to solve these problems, a deterioration determining operation for determining whether a catalytic converter has deteriorated and a normal determining operation for determining whether a catalytic converter is normal are separately performed in this embodiment. Further, a flow range which allows the deterioration determining operation and a flow range which allows the normal determining operation are set independently to each other in this embodiment. Thus, the opportunity for performing determining operation can be maintained without lowering the accuracy of determination.

Figure 5A:
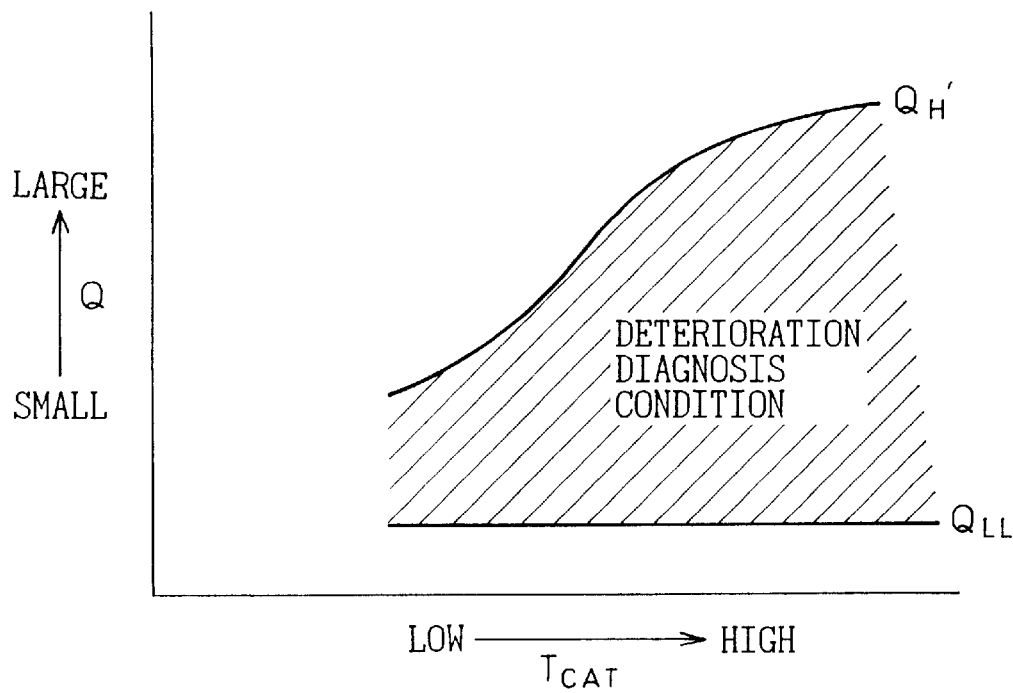
FIGS. 5A and 5B show the intake air flow ranges where the deterioration determining operation and the normal determining operation are performed.
Figure 5B:
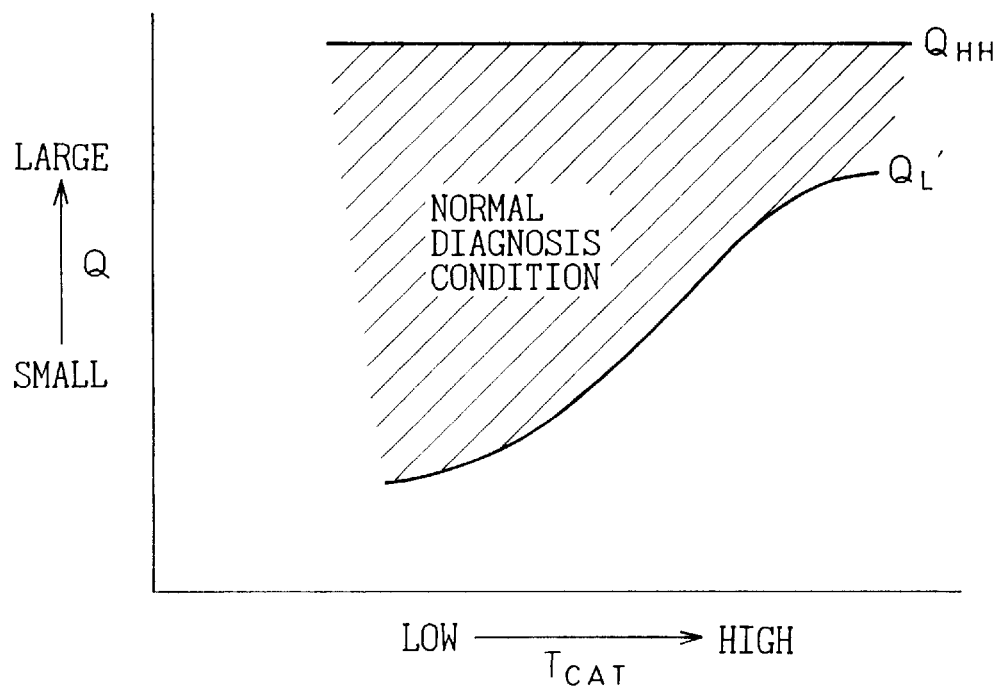

FIG. 5A illustrates a deterioration diagnosis condition (a first condition) where the deterioration determining operation is performed, and FIG. 5B illustrates a normal diagnosis condition (a second condition) where the normal determining operation is performed. The upper limit $Q_H'$ of the intake air flow rate in the deterioration diagnosis condition (FIG. 5A) is the same as the upper limit $Q_H'$ of the intake air flow rate in FIG. 4 and, the lower limit $Q_L'$ of the intake air flow rate in the normal diagnosis condition (FIG. 5B) is the same as the lower limit $Q_L'$ of the intake air flow rate in FIG. 4. The lower limit $Q_{LL}$ in FIG. 5A and the upper limit $Q_{HH}$ in FIG. 5b are appropriate limit values set at constants sufficiently small ($Q_{LL}$) and large ($Q_{HH}$), respectively.

Figure 6:
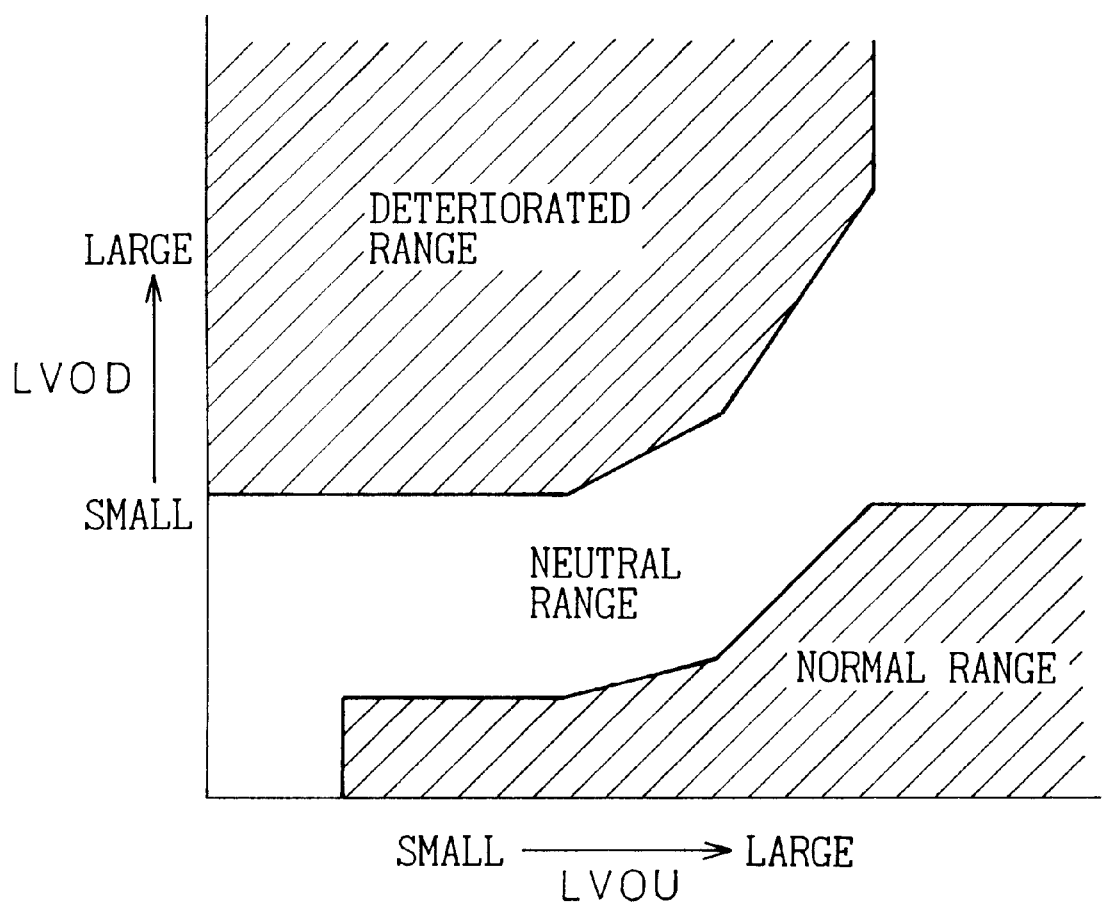
FIG. 6 is a diagram showing threshold values used for determining deterioration of the catalytic converter.

FIG. 6 shows a map used for the deterioration determining operation and the normal determining operation in this embodiment. In the map in FIG. 6, the vertical axis represents the length LVOD of the output response curve of the downstream $O_2$ sensor 15 and the horizontal axis represents the length LVOU of the output response curve of the upstream air-fuel ratio sensor 13. Namely, the map using the lengths LVOD and LVOU, instead of the ratio LVOD/LVOU is used for determining deterioration of the catalytic converter. The reason why the map is used for determining deterioration of the catalytic converter, instead of the value of the ratio LVOD/LVOU itself, is that it is difficult to determine deterioration correctly based on the value of the LVOD/LVOU in some cases (for example, when LVOU is very large or very small).

Further, in this embodiment, a deteriorated range where the catalytic converter is determined as having deteriorated when the set of the values LVOD and LVOU falls in this range, and a normal range where the catalytic converter is determined as being normal when the set of the values LVOD and LVOU falls in this range are provided. As shown in FIG. 6, a neutral range is disposed between the deteriorated range and the normal range. As explained later, the catalytic converter is determined as having deteriorated when the set of lengths LVOD and LVOU falls in the deteriorated range in FIG. 6 in the deterioration determining operation. However, in the deterioration determining operation, the determination is not carried out if the set of lengths LVOD and LVOU falls in the neutral or normal range. Similarly, in the normal determining operation, though the catalytic converter is determined as being normal when the set of LVOD and LVOU falls in the normal range in FIG. 6, determination is not carried out in other cases.

The deterioration determining operation which determines that the catalytic converter has deteriorated is performed only when the intake air flow rate of the engine is smaller than the upper limit $Q_H'$ in FIG. 5A. Since the upper limit $Q_H'$ in FIG. 5A (and FIG. 4) is a maximum intake air flow rate where a normal catalytic converter is always determined as being normal. This means that a normal catalytic converter is never incorrectly determined as having deteriorated when intake air flow rate is smaller than the upper limit $Q_H'$ at the respective temperatures of the catalytic converter in FIG. 5A. Therefore, if the deterioration determining operation is carried out in this flow range, a normal catalytic converter is never determined incorrectly as having deteriorated and, if a catalytic converter is determined as having deteriorated by the deterioration determining operation carried out in this range, it is considered that the catalytic converter has actually deteriorated.

On the other hand, the normal determining operation which determines that the catalytic converter is normal is carried out only when the intake air flow rate is larger than the lower limit $Q_L'$ in FIG. 5A. The lower limit $Q_L'$ in FIG. 5A is a minimum intake air flow rate where a deteriorated catalytic converter is always determined as having deteriorated. This means that a deteriorated catalytic converter is never determined incorrectly as being normal in this flow range. Therefore, if a catalytic converter is determined as being normal in this flow range, it is considered that the catalytic converter is actually normal.

Further, in this embodiment, if the set of the lengths LVOD and LVOU does not fall in the deteriorated range in FIG. 6, the deterioration determining operation does not determine whether the catalytic converter has deteriorated (i.e., the operation does not determine that the catalytic converter has deteriorated, nor it is normal). Similarly if the set of the lengths LVOD and LVOU does not fall in the normal range in FIG. 6, the normal determining operation does not determine whether the catalytic converter is normal (i.e., the operation does not determine that the catalytic converter is normal, nor it has deteriorated). Therefore, by setting the deterioration diagnosis condition (FIG. 5A) and the normal diagnosis condition (FIG. 5B) separately to each other, at least one of the conditions FIG. 5A and FIG. 5B is satisfied in almost all operating conditions (intake air flow rate and the temperature of the catalytic converter), and at least one of the deterioration determining operation and the normal determining operation can be performed in almost all the operating conditions of the engine. Thus, the opportunity for determining deterioration of catalytic converter largely increases during the engine operation compared to the case in FIG. 4.

Since the flow ranges (FIGS. 5A and 5B) are set in accordance with the temperature $T_{cat}$ of the catalytic converter in this embodiment, it is necessary to detect the exhaust gas flow rate Q and the temperature $T_{cat}$ during the operation in order to determine whether the conditions for performing the determining operation is satisfied. The exhaust gas flow rate Q is the same as the flow rate of intake air, therefore, the flow rate detected by the airflow meter 3 can be used as the exhaust gas flow rate. The temperature $T_{cat}$ may be detected directly by disposing a temperature sensor in the catalyst bed of the catalytic converter 12. However, in this embodiment, the temperature $T_{cat}$ is detected (determined) indirectly from the engine load conditions to eliminate the cost increase incurred by the temperature sensor.

Next, the method for determining the temperature $T_{cat}$ in this embodiment is explained.

Figure 7:
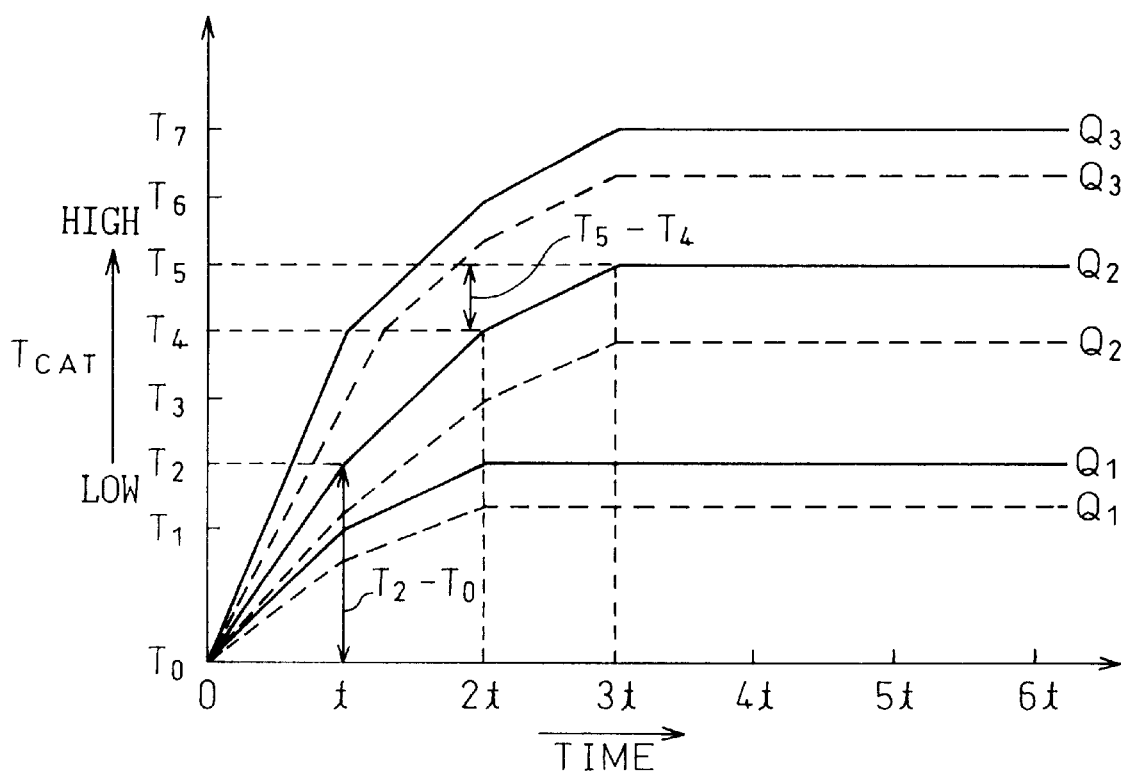
FIGS. 7 and 8 are diagrams showing a relationship between the temperature of the catalytic converter and the exhaust gas flow rate.
Figure 8:
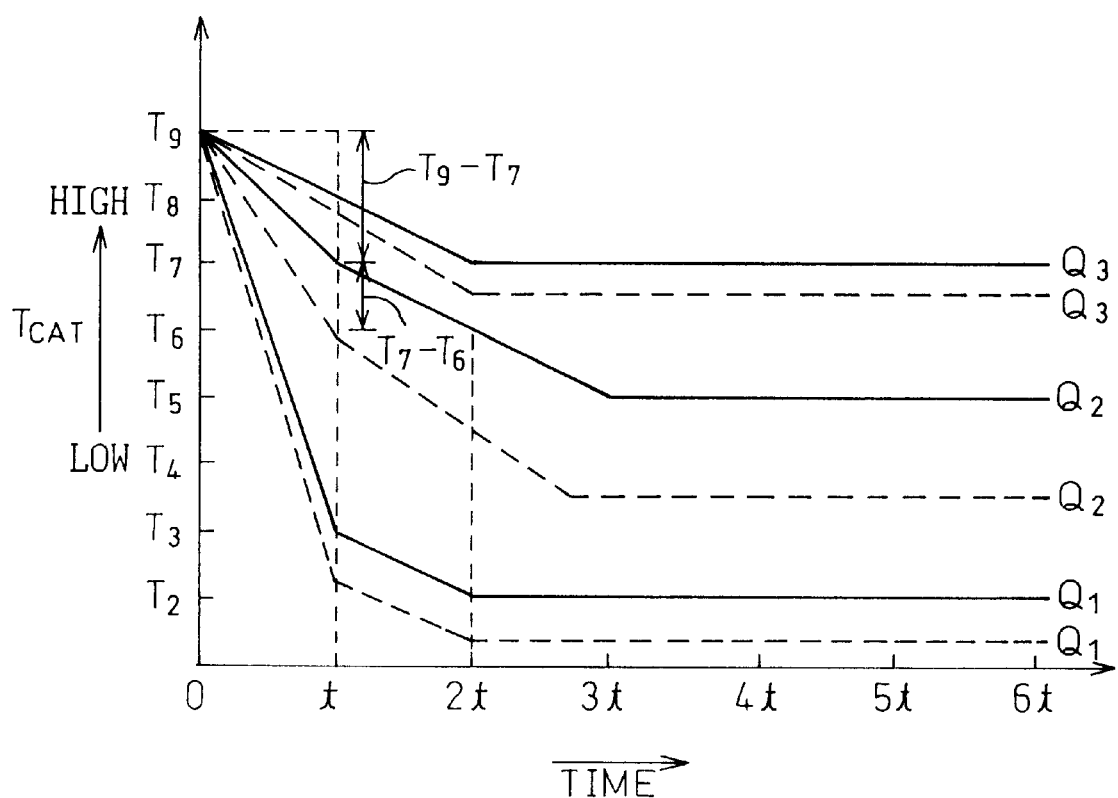

During the actual operation of the engine, the temperature of the catalytic converter changes in accordance with the operating conditions of the engine. However, when the air-fuel ratio of the engine is feedback controlled, the exhaust gas temperature does not change largely. Therefore, the rate of change in the temperature of the catalytic converter is determined by the exhaust gas (intake air) flow rate and the temperature of the catalytic converter. FIGS. 7 and 8 show the relationships between the rate of change in the temperature $T_{cat}$ and the flow rate Q. FIG. 7 shows the case where the temperature $T_{cat}$ increases (i.e., the catalytic converter is heated), and FIG. 8 shows the case where the temperature $T_{cat}$ decreases (i.e., the catalytic converter is cooled). In FIGS. 7 and 8, the horizontal axis represents time expressed by unit time "t". Unit time "t" is equal to the interval of the execution of the temperature determining operation which is explained later.

As seen from FIG. 7, the temperature of the catalytic converter increases rapidly when the temperature $T_{cat}$ is low and the flow rate Q is large, and the rate of increase of the temperature becomes smaller as the temperature of the catalytic converter becomes higher, then, the temperature $T_{cat}$ approaches a final temperature determined by the flow rate Q as the time elapses. For example, in FIG. 7, if the flow rate is $Q_2$, the temperature $T_{cat}$ increases by $(T_2-T_0)$ per unit time (t) when the temperature $T_{cat}$ is $T_0$. However, when the temperature $T_{cat}$ is $T_4$, the temperature increase per unit time decreases to $(T_5-T_4)$, and when the temperature $T_{cat}$ is $T_5$ (i.e., final temperature at flow rate $Q_2$), the temperature increase per unit time becomes 0. Similarly to this, when the catalytic converter is cooled (FIG. 8), the temperature of the catalytic converter decreases rapidly when the temperature $T_{cat}$ is high and the flow rate Q is small, and the rate of decrease of the temperature becomes smaller as the temperature $T_{cat}$ becomes lower, and the temperature $T_{cat}$ approaches the final temperature determined by the flow rate Q.

Figure 9:
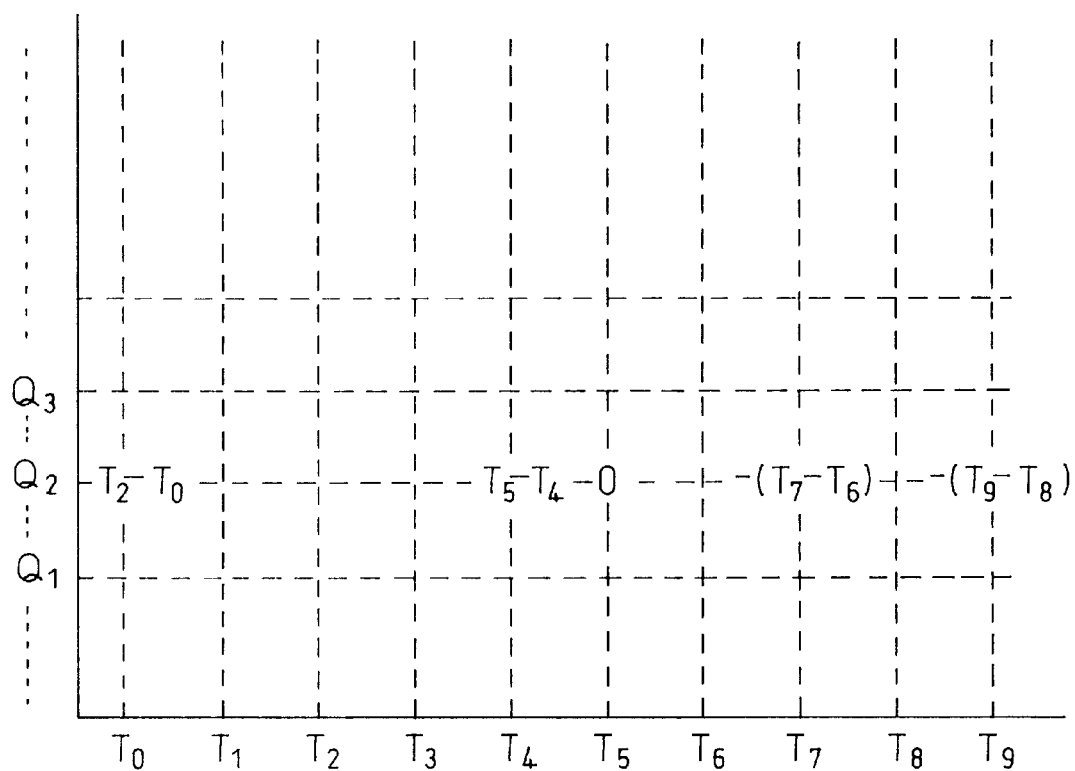
FIG. 9 shows an example of the form of the numerical table used for the temperature calculation of the catalytic converter.

In this embodiment, the relationships in FIGS. 7 and 8 are obtained by experiment, and the change $\Delta T_{cat}$ per unit time is stored in the ROM 104 in the control circuit 10 as a numerical table (map) using the temperature $T_{cat}$ and the flow rate Q in the form as shown in FIG. 9. Further, though FIGS. 7 and 8 show the temperature change when the air-fuel ratio feedback control is carried out, similar relationships as those in FIGS. 7 and 8 during the fuel increment operation (for example, during warming up and full power operation of the engine 1), and the fuel cut operation (for example, during engine braking) are also obtained by experiment, and stored in the ROM 104 as the numerical tables in the form as shown in FIG. 9. The control circuit 10 determines the amount of the temperature change $\Delta T_{cat}$ per unit time using these numerical tables at regular interval, and determines the temperature $T_{cat}$ of the catalytic converter 12 by accumulating the value $\Delta T_{cat}$ during the engine operation.

Figure 10:
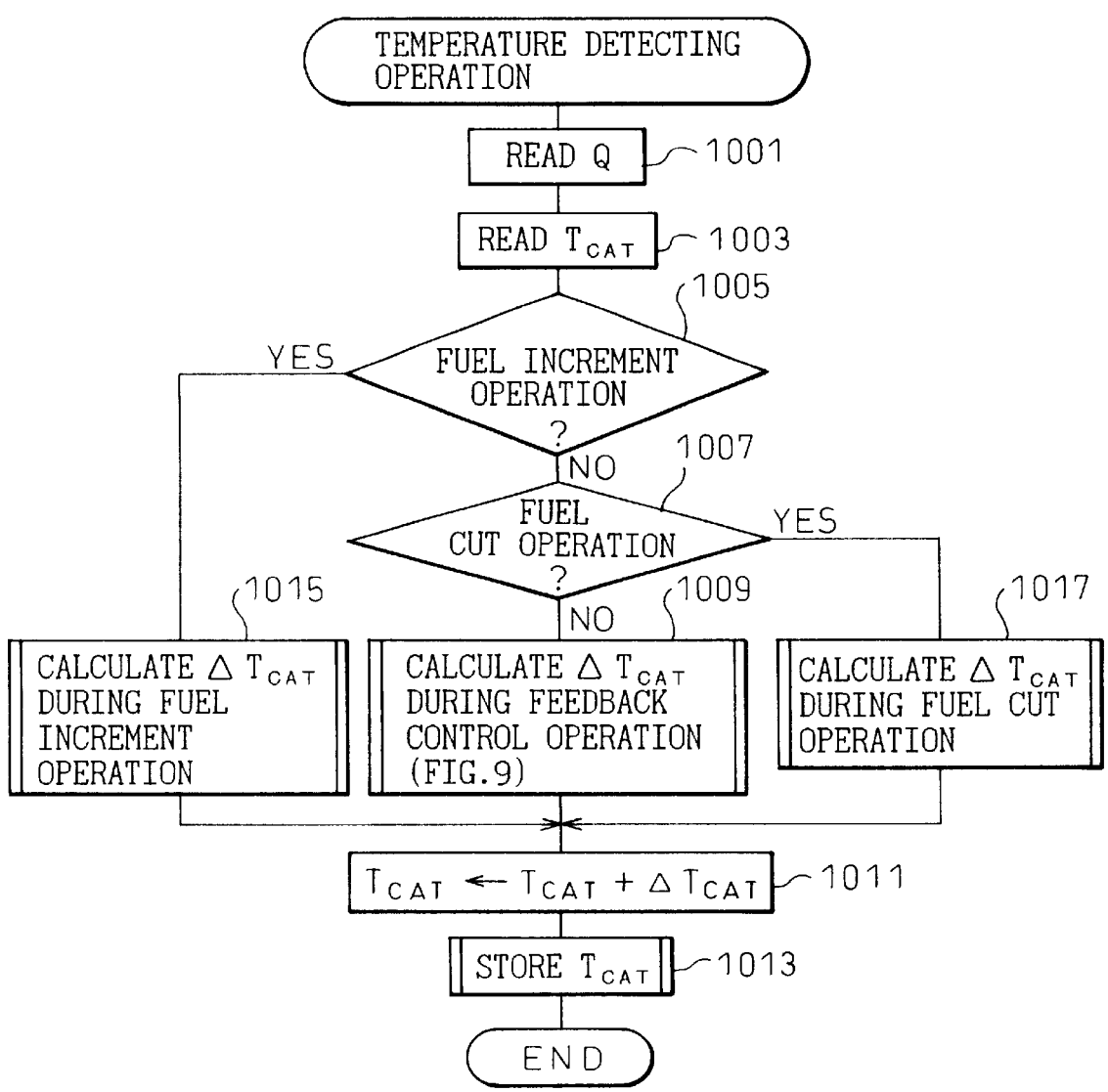
FIG. 10 is a flowchart illustrating an embodiment of the operation for detecting the temperature of the catalytic converter.

FIG. 10 is a flowchart showing the temperature detecting operation for detecting the temperature $T_{cat}$ of the catalytic converter. This operation is performed by a routine executed by the control circuit 10 at a regular interval of t in FIGS. 7 and 8.

In FIG. 10, the inlet air flow Q and the temperature $T_{cat}$ of the catalytic converter 12 are read from the RAM 105 at steps 1001 and 1003, respectively. The temperature $T_{cat}$ read in at step 1003 is the temperature of the catalytic converter calculated when the operation was last executed. In this embodiment, the temperature of the intake air or the cooling water, whichever is higher, is used as an initial value of $T_{cat}$ when the operation is first executed. At steps 1005 and 1007, it is determined whether the fuel increment operation (step 1005) in which the fuel injection amount is increased, or the fuel cut operation (step 1007) in which fuel injection is interrupted, is being performed. When neither the fuel increment nor the fuel cut operation is being performed, since it is considered that the air-fuel ratio feedback control is being performed, the operation executes step 1009 to determine the rate of change $\Delta T_{cat}$ based on the present temperature $T_{cat}$ and the flow rate Q. When the fuel increment or the fuel cut operation is being performed, $\Delta T_{cat}$ is determined using the numerical table corresponding to the fuel increment condition or the fuel cut condition (step 1015 or step 1017).

After determining $\Delta T_{cat}$, the present temperature $T_{cat}$ of the catalytic converter is calculated by $T_{cat}=T_{cat}+\Delta T_{cat}$ at step 1011, and stored in the RAM 105 at step 1013. By accumulating the amount $\Delta T_{cat}$ of the change in the temperature of the catalytic converter from the start of the engine 1 at step 1011, the present temperature $T_{cat}$ of the catalytic converter 12 is always stored in the RAM 105.

Figure 11:
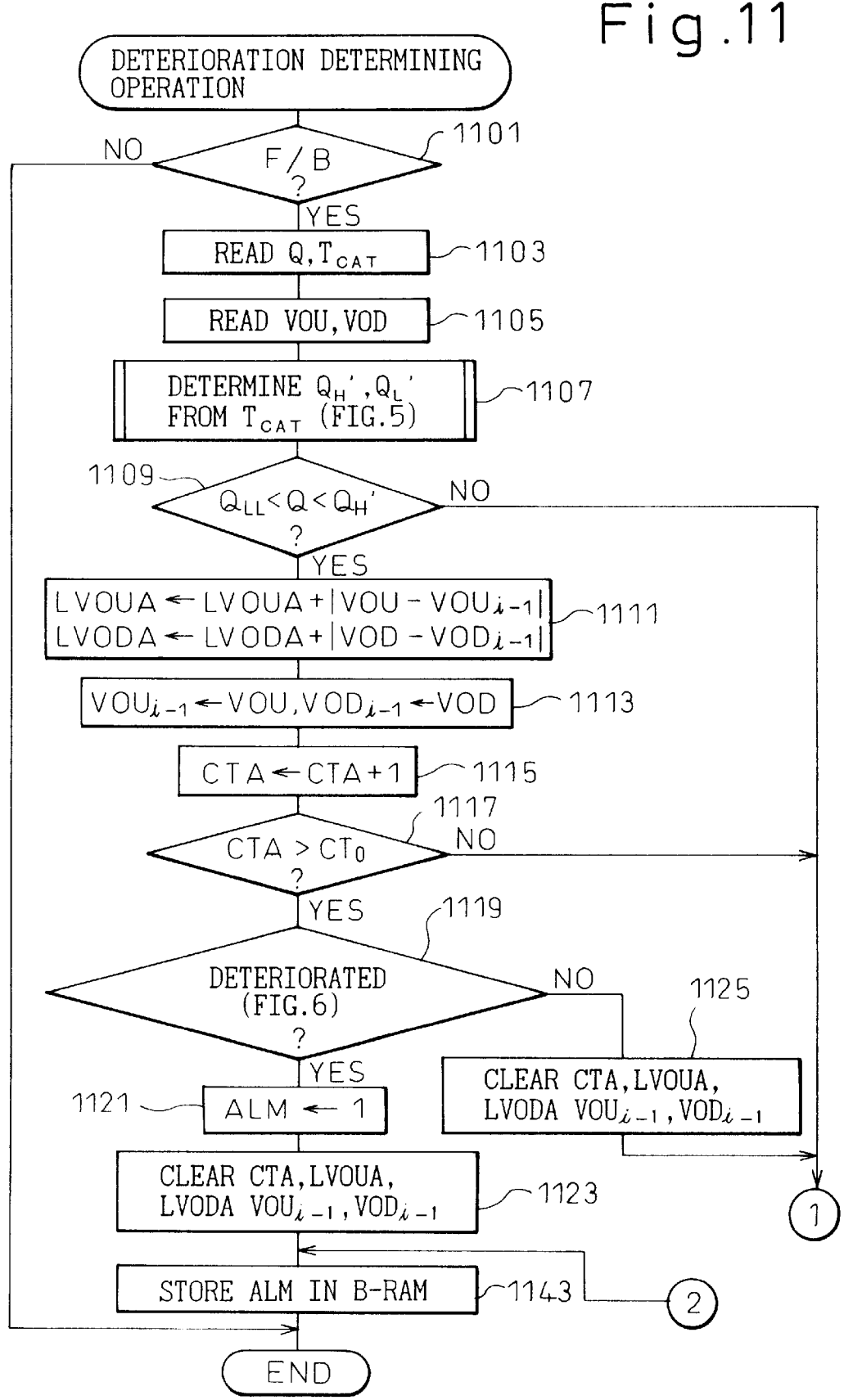
FIGS. 11 and 12 are a flowchart illustrating an embodiment of the operation for determining deterioration of the catalytic converter.
Figure 12:
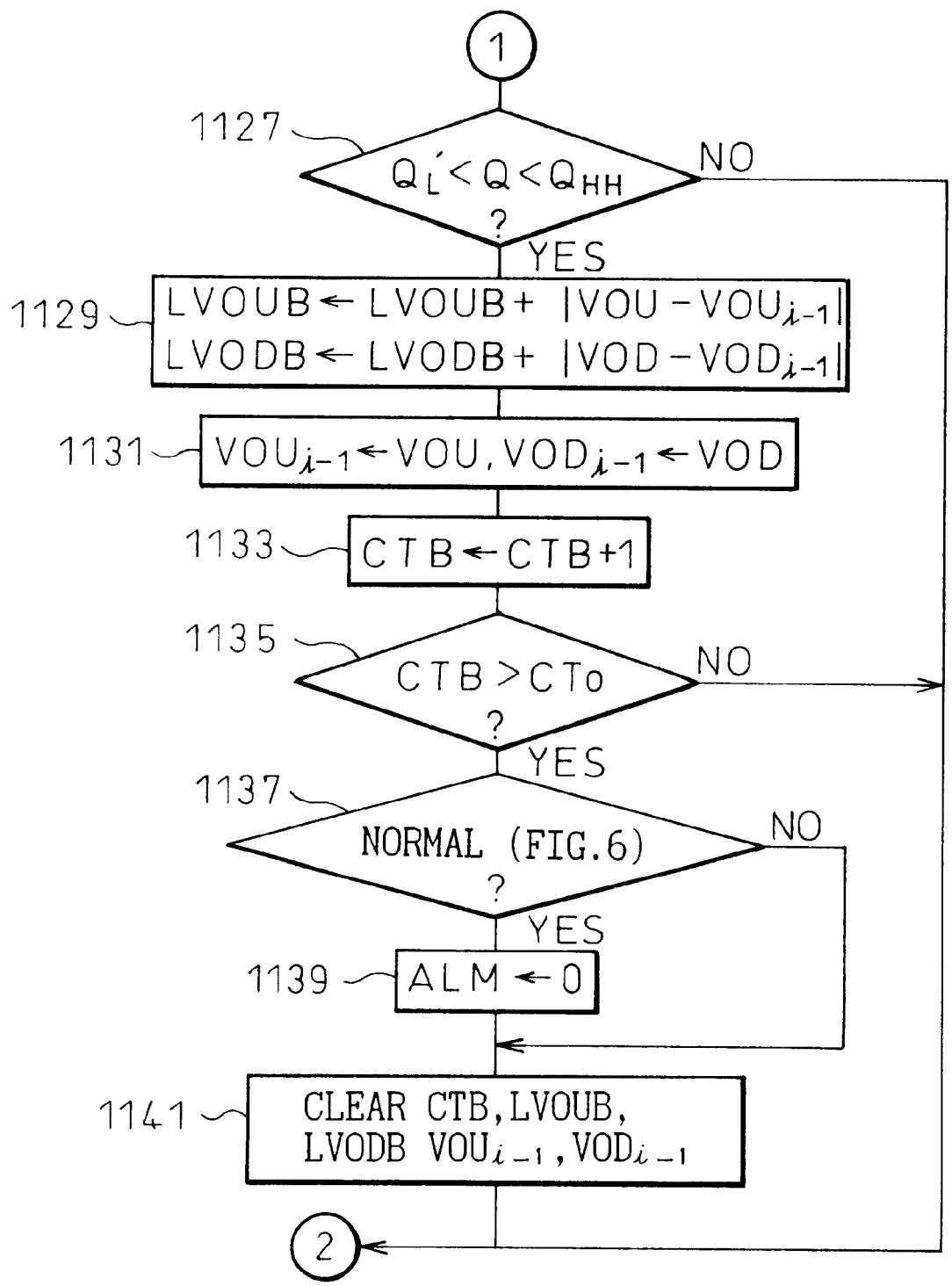

FIGS. 11 and 12 show a flowchart of the operation for determining deterioration of the catalytic converter in this embodiment. The operation in FIGS. 11 and 12 is performed by a routine executed by the control circuit 10 at predetermined regular intervals.

When the operation starts in FIG. 11, it is determined at step 1101 whether the air-fuel ratio feedback control is being performed, and if the air-fuel ratio feedback control is not being performed, the operation terminates immediately. If the air-fuel ratio feedback control is being performed at step 1101, the operation reads the intake air flow rate Q of the engine 1 and the temperature $T_{cat}$ of the catalytic converter estimated by the operation in FIG. 10 at step 1103.

Further, the operation performs step 1105 to fetch the outputs VOU of the upstream air-fuel ratio sensor 13 and VOD of the downstream $O_2$ sensor 15. At step 1107, the upper limit $Q_H'$ of the deterioration diagnosis flow range and the lower limit $Q_L'$ of the normal diagnosis flow range are determined from FIGS. 5A and 5B, respectively, based on the temperature $T_{cat}$.

After determining $Q_H'$ and $Q_L'$ it is determined whether the present intake air flow rate Q falls in either of the deterioration diagnosis range or the normal diagnosis range at steps 1109 and 1127, and the determination of deterioration is performed in accordance with the determined diagnosis ranges at steps 1111 through 1141 in FIG. 12.

Namely, it is determined at step 1109 whether the present intake air flow rate Q satisfies the deterioration diagnosis condition and, if the deterioration diagnosis condition is satisfied (i.e., if $Q_{LL}<Q<Q_H'$ at step 1109), the approximate lengths LVOUA and LVODA of the output response curves of the upstream air-fuel ratio sensor 13 and the downstream $O_2$ sensor 15 are calculated by LVOUA=LVOUA+|VOU−|VOU −VOU$_{i-1}$|, and LVODA=VODA+|VOD−VOD$_{i-1}$| at step 1111. LVOUA and LVODA are the lengths of the output response curves of the sensors 13 and 15 used for the deterioration determining operation and, VOU$_{i-1}$ and VOD$_{i-1}$ are the values of the output VOU of the upstream air-fuel ratio sensor 13 and the output VOD of the downstream $O_2$ sensor 15 when the operation was last performed. The length of the output response curves of the sensors 13 and 15 are approximately calculated by accumulating the absolute values of the amounts of changes of the sensor outputs from the operation was last performed. At step 1113, the values of VOU$_{i-1}$ and VOD$_{i-1}$ are renewed to prepare for the next execution of the operation.

Steps 1115 and 1117 represent the operation for measuring the period for calculating the lengths of the output response curves of the sensors 13 and 15. The period for calculating the lengths LVOU and LVOD is measured by counting up the value of a time counter CTA and, when the value of CTA reaches a predetermined value $CT_0$, the calculations of the lengths LVOU and LVOD are terminated in order to determine whether the catalytic converter has deteriorated based on the calculated lengths LVOU and LVOD at step 1119. The predetermined value $CT_0$ is set so that the calculations of the lengths of the output response curves are performed for 20 to 40 seconds, for example.

At step 1119, the operation determines whether the catalytic converter has deteriorated. As explained before, since the present flow rate Q falls in the deterioration diagnosis range at step 1109, it is determined only whether the catalytic converter has deteriorated at step 1119, i.e., it is determined whether the set of the values LVOUA and LVODA falls in the deteriorated range in FIG. 6. If it falls in the deteriorated range in FIG. 6, the operation determines that the catalytic converter has deteriorated and executes step 1121 to set the alarm flag ALM to 1. When the flag ALM is set to 1, an alarm is activated by a separate operation performed by the control circuit 10 in order to notify the vehicle driver that the catalytic converter has deteriorated. In this case, the values of the counter CTA, lengths LVOUA and LVODA are reset to 0 at step 1123, and the value of the flag ALM is stored in the backup RAM 106 to prepare for future repair and maintenance. If the deterioration diagnosis condition is not satisfied at step 1109, or if the time $CT_0$, has not elapsed at step 1117, the operation proceeds to step 1127 in FIG. 12. Further, if the catalytic converter is not determined as having deteriorated at step 1119, the operation executes step 1125 to reset the values of CTA, LVOUA, LVODA to 0 before it proceeds to step 1127.

Step 1127 in FIG. 12 represents the determination whether the normal diagnosis condition is satisfied. If the normal diagnosis condition is satisfied at step 1127, i.e., if $Q_L'<Q<Q_{HH}$ at step 1127, operation executes steps 1129 through 1135 to calculate lengths LVOUB and LVODB of the output response curves of the sensors 13 and 15 used for the normal determining operation. The lengths LVOUB and LVODB are calculated in the manner the same as those in steps 1111 through 1117.

After calculating the lengths LVOUB and LVODB, the operation executes step 1137 to determine whether the catalytic converter is normal, i.e., whether the set of lengths LVOUB and LVODB falls in the normal range in FIG. 6. If the catalytic converter is determined as being normal at step 1137, the value of the flag ALM is reset to 0 at step 1139, and the values of the counter CTB, the lengths LVOUB and LVODB, the outputs VOU$_{i-1}$, and VOD$_{i-1}$ are reset to 0 at step 1141. In this case, the value of the ALM is stored in the backup RAM 106 at step 1143 in FIG. 11. If the catalytic converter is not determined as being normal, i.e., if the set of the lengths LVOUB and LVODB does not fall in the normal range in FIG. 6, the operation proceeds to step 1141 without changing the value of the flag ALM.

As explained above, by the operation in FIGS. 11 and 12, it is determined whether the catalytic converter has deteriorated when the condition where a normal catalytic converter is never determined as having deteriorated (i.e., the deterioration diagnosis condition) is satisfied, and whether the catalytic converter is normal when the condition where a deteriorated catalytic converter is never determined as being normal (the normal diagnosis condition) is satisfied. Therefore, since the determining operation is performed when either of the deterioration diagnosis condition and the normal diagnosis condition is satisfied, the opportunity for performing the determining operation of deterioration largely increases in this embodiment.

Next, another embodiment of the present invention will be explained with reference to FIG. 13. In the previous embodiment, the intake air flow ranges which allow the determining operations vary in accordance with the temperature of the catalytic converter. However, in this embodiment, the intake air flow ranges where the determining operations are carried out are fixed, and the deterioration determining operation and the normal determining operation are performed in accordance with the temperature of the catalytic converter when the intake air flow rate of the engine is in the fixed range.

Figure 13:
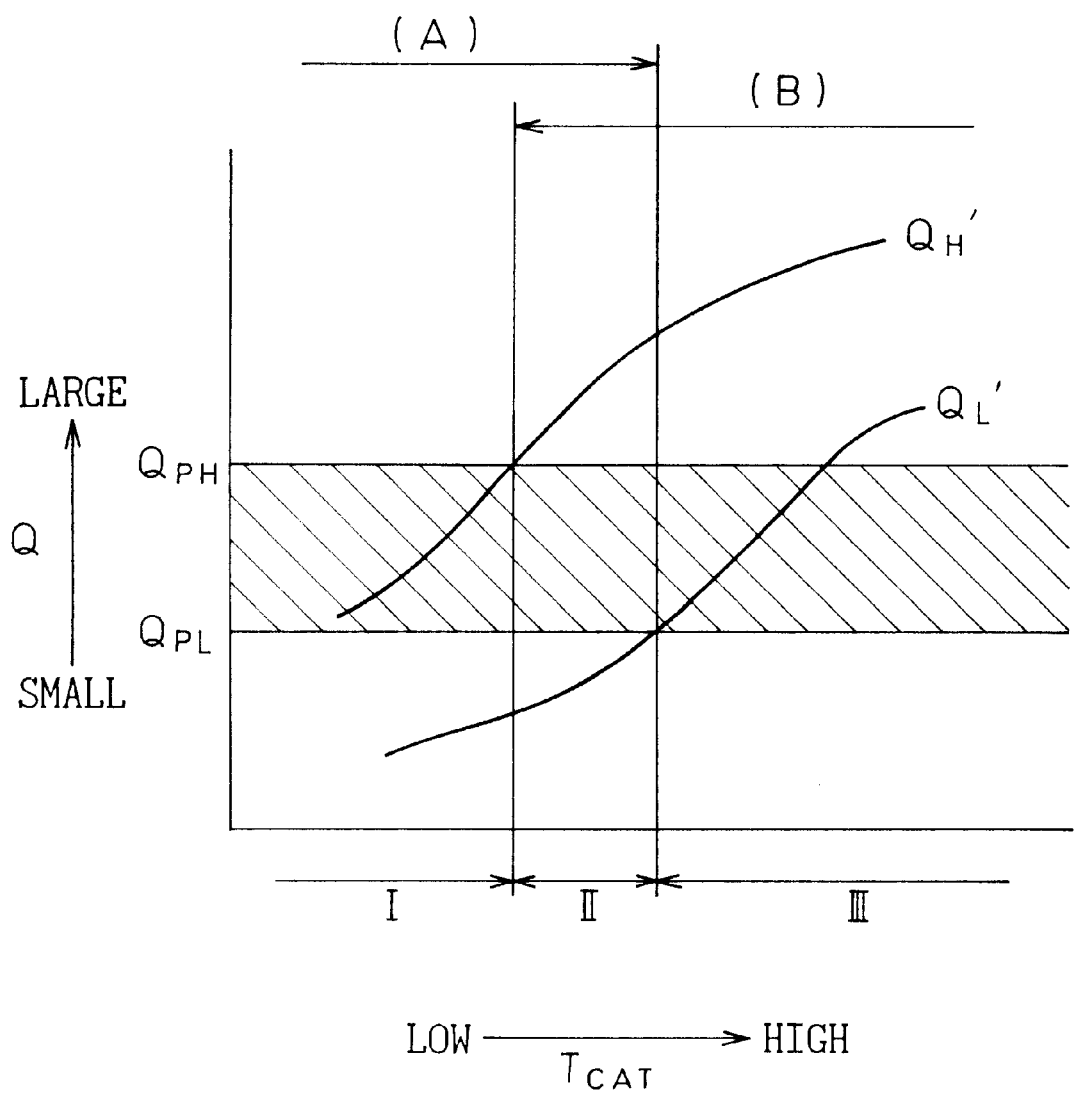
FIG. 13 shows another example of the intake air flow ranges where the deterioration determining operation and the normal determining operation are performed.

FIG. 13 illustrates the deterioration diagnosis condition and the normal diagnosis condition in this embodiment. In FIG. 13, the lines $Q_H'$ and $Q_L'$ are the same as those in FIGS. 5A and 5B. The lines $Q_{PH}$ and $Q_{PL}$ are the upper limit and the lower limit of the intake air flow range for performing the determining operations. Namely, the deterioration determining operation and the normal determining operation are performed when the intake air flow rate of the engine is between the fixed upper limit $Q_{PH}$ and the fixed lower limit $Q_{PL}$, in this embodiment. As shown in FIG. 13, the upper limit $Q_H'$ of the deterioration diagnosis condition and the lower limit $Q_L'$ of the normal diagnosis condition changes in accordance with the temperature $T_{cat}$ of the catalytic converter. Therefore, if the intake air flow range for performing the determining operations is fixed, the deterioration diagnosis condition and the normal diagnosis condition are determined by only the temperature $T_{cat}$, as seen from FIG. 13. In FIG. 13, for example, when the temperature $T_{cat}$ is within the temperature range (A), the fixed flow range ($Q_{PL}<Q<Q_{PH}$) always satisfies the normal diagnosis condition ($Q_L'<Q$), and when $T_{cat}$ is in the range (B), the fixed flow range ($Q_{PL}<Q_{PH}$) always satisfies the deterioration diagnosis condition ($Q<Q_H'$). Namely, the normal diagnosis condition (the range (A)) and the deterioration diagnosis condition (the range (B)) in FIG. 13 are determined only based on the temperature $T_{cat}$. The temperature ranges (A) and (B) partially overlaps, and both of the normal diagnosis condition and the deterioration diagnosis condition are satisfied in this overlapped portion.

In this embodiment, the temperature $T_{cat}$ of the catalytic converter is divided into three continuous temperature ranges I, II and III as shown in FIG. 13. In the temperature range I in FIG. 13, only the normal determining operation is carried out. In the temperature range II (the overlapped portion), both normal determining operation and deterioration determining operation are carried out and, in the temperature range III, only the deterioration determining operation is carried out. By setting the diagnosis ranges continuously based on the temperature $T_{cat}$ as shown in FIG. 13, the determining operation is performed regardless of the temperature $T_{cat}$ of the catalytic converter if only the intake air flow rate condition ($Q_{PL}<Q<Q_{PH}$) is satisfied.

Figure 14:
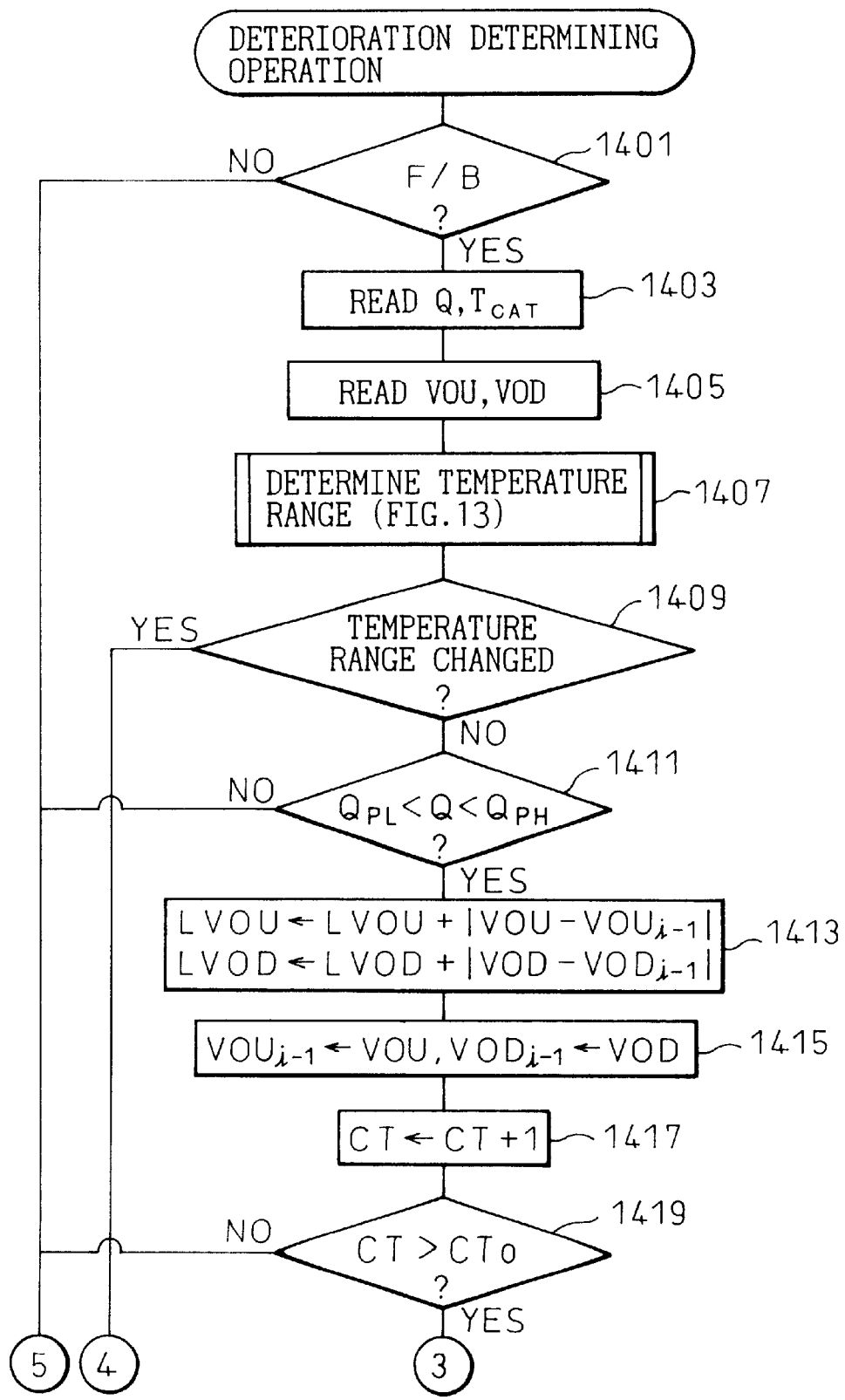
FIGS. 14 and 15 are a flowchart illustrating another embodiment of the operation for determining deterioration of the catalytic converter.
Figure 15:
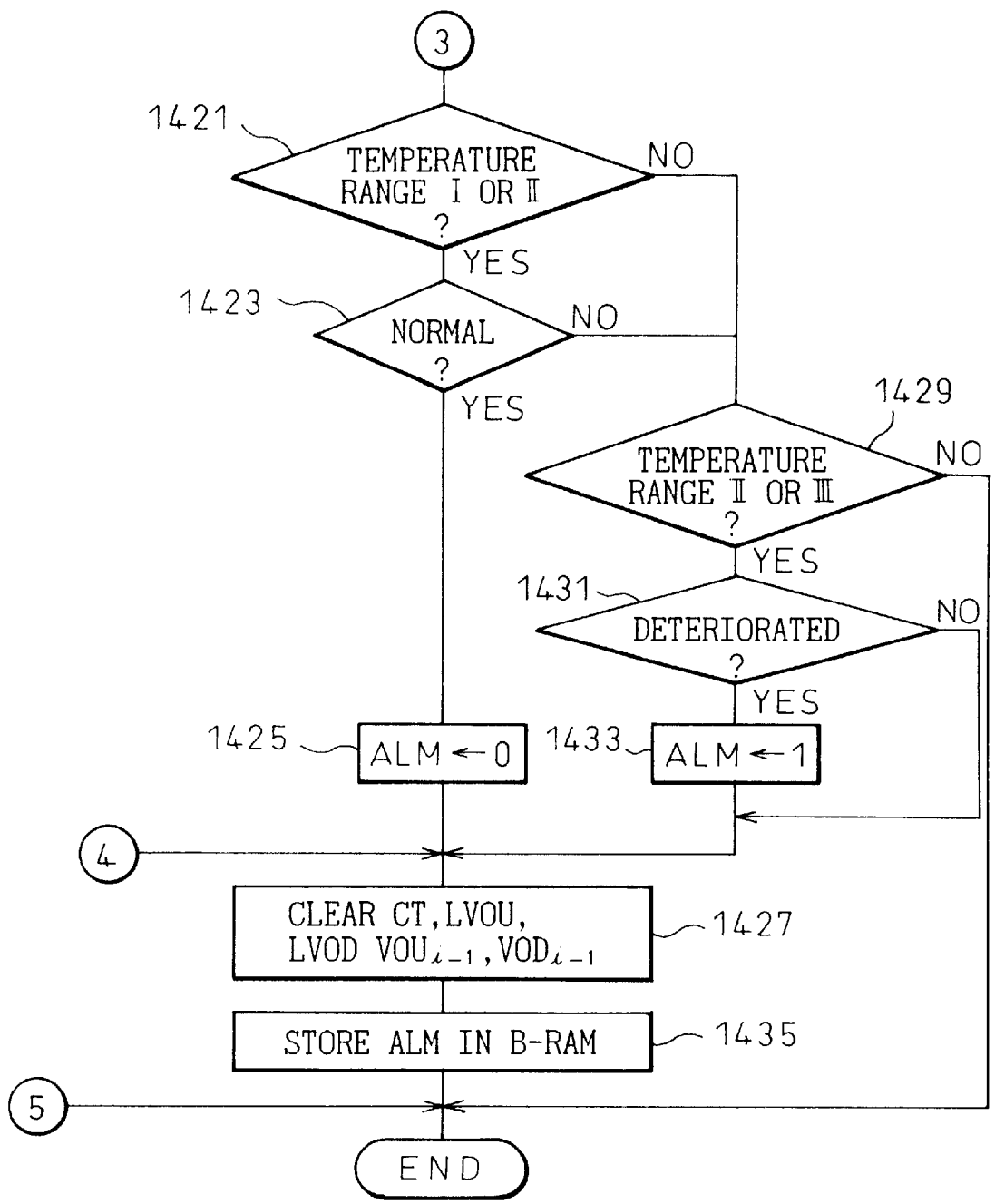

FIGS. 14 and 15 are a flowchart illustrating the determining operation of deterioration of the catalytic converter according to the present embodiment. This operation is performed by a routine executed by the control circuit 10 at regular intervals.

In FIG. 14, it is determined whether the air-fuel ratio feedback control is being carried out at step 1401, and intake air flow rate Q of the engine and the temperature $T_{cat}$ of the catalytic converter are read at step 1403, and the outputs VOU and VOD of the upstream air-fuel ratio sensor 13 and the downstream $O_2$ sensor 15, respectively, are read. Steps 1401, 1403 and 1405 are steps similar to steps 1101, 1103 and 1105 in FIG. 11.

At step 1407, the temperature range (I, II and III in FIG. 13) corresponding to the present $T_{cat}$ is determined, and at step 1409, it is determined whether the temperature range determined at step 1407 has changed since the operation was last executed. If the temperature range has changed, the values of the calculated lengths LVOU and LVOD are reset to 0 at step 1427 in FIG. 15. Namely, the calculation of the lengths LVOU and LVOD are performed separately in each temperature range in order to increase the accuracy of the determination and, when the temperature range changes, the calculation of the lengths LVOU and LVOD newly starts in this embodiment. If the temperature range has not changed at step 1409, the operation executes step 1411 in order to determine whether the intake air flow rate Q of the engine satisfies the flow rate condition for performing the determining operations ($Q_{PL}<Q<Q_{PH}$). If the condition ($Q_{PL}<Q<Q_{PH}$) is not satisfied, the operation terminates immediately without performing step 1413 through 1435.

If the flow rate condition for performing the determining operation is satisfied at step 1411, the lengths LVOU and LVOD are calculated by accumulating the amounts of changes in the output VOU and VOD, respectively, for a predetermined time $CT_0$ at steps 1413 through 1419. CT in step 1417 is a time counter similar to CTA and CTB in FIGS. 11 and 12.

When the time $CT_0$ has elapsed at step 1419, deterioration of the catalytic converter is determined by the following steps. Namely, at step 1421, it is determined whether the current temperature range determined at step 1407 is either the range I or the range II in FIG. 13 and, if the current temperature range is either the ranges I or II, the operation performs the normal determining operation at step 1423 in order to determine whether the catalytic converter is normal based on the calculated values of LVOU and LVOD and the criteria in FIG. 6. Then, if the catalytic converter is determined as being normal in the normal determining operation, the alarm flag ALM is reset to 0 at step 1425, and the values of the counter CT, the lengths LVOU, LVOD, the outputs $VOU_{i-1}$, and $VOD_{i-1}$ are all reset to 0 at step 1427, and the value of the flag ALM is stored in the backup RAM 106 at step 1435 before the operation terminates.

If the current temperature range is neither range I or range II at step 1421, or, if the catalytic converter is not determined as being normal at step 1423, the operation executes step 1429 to determine whether the current temperature range is either range I or range II. If the current temperature range is either range I or range II at step 1429, the operation performs the deterioration determining operation at step 1431 in order to determine whether the catalytic converter has deteriorated based on the calculated values of LVOU and LVOD and the criteria in FIG. 6. If the catalytic converter is determined as having deteriorated at step 1431, the value of the flag ALM is set to 1 at step 1433 before executing steps 1427 and 1435 as explained before. Further, if the catalytic converter is not determined as having deteriorated at step 1431, steps 1427 and 1435 are executed without changing the value of the flag ALM. By the operation shown in FIGS. 14 and 15, it will be understood that, if the current temperature range is the range II in FIG. 13, the normal determining operation is first performed at step 1423 and if the catalytic converter is not determined as being normal in the normal determining operation, the deterioration determining operation is then performed at step 1431.

Next, another embodiment of the present invention will be explained. In the previous embodiments, the temperature $T_{cat}$ of the catalytic converter is detected (estimated) using the method illustrated in FIGS. 6 through 10. The method of FIGS. 6 through 10 assumes that the degree of deterioration of a catalytic converter does not affect the temperature of the catalytic converter. However, in the actual catalytic converter, the temperature of the catalytic converter changes in accordance with the degree of deterioration of the catalytic converter even though the operating condition, such as intake air flow rate, is the same. For example, assuming that the solid lines in FIGS. 7 and 8 represent the case where a normal catalytic converter is used, the change in the temperature when the catalytic converter has deteriorated is represented by the broken lines in FIGS. 7 and 8. As seen from FIGS. 7 and 8, the rate of increase in the temperature becomes smaller and the rate of decrease in the temperature becomes larger when the catalytic converter has deteriorated. Further, the final temperatures at the respective intake air flow rates also become lower when the catalytic converter has deteriorated. Therefore, if the temperature of the catalytic converter is calculated based on the solid lines in FIGS. 7 and 8 (i.e., based on a normal catalytic converter), the actual temperature of the catalytic converter becomes lower than the calculated temperature if a deteriorated catalytic converter is used.

Therefore, if the lower limit $Q_L'$ in FIG. 5B of a deteriorated catalytic converter is determined from the temperature $T_{cat}$ calculated on the basis that the catalytic converter is normal (i.e., based on the solid lines in FIGS. 7 and 8), the determined lower limit $Q_L'$ becomes larger than the lower limit actually required.

On the other hand, if the temperature of the catalytic converter is calculated based on the broken lines in FIGS. 7 and 8 (i.e., based on a deteriorated catalytic converter), the actual temperature of the catalytic converter becomes higher than the calculated temperature if a catalytic converter not having deteriorated is used. In this case, the upper limit $Q_H'$ (FIG. 5A) becomes smaller than a value actually required if the catalytic converter has not deteriorated. Therefore, if the temperature $T_{cat}$ is calculated based on a catalytic converter either deteriorated or normal, the range between the $Q_H'$ and $Q_L'$ determined from the calculated $T_{cat}$ becomes narrower than actually required.

In order to solve this problem, the upper limit $Q_H'$ is determined from the temperature $T_{cat}$ which is calculated based on a normal catalytic converter (i.e., based on the solid lines in FIGS. 7 and 8), and the lower limit $Q_L'$ is determined from the temperature $DT_{cat}$ which is calculated based on a deteriorated catalytic converter (i.e., based on the broken lines in FIGS. 7 and 8) in this embodiment.

Namely, in this embodiment, the temperature $T_{cat}$ is calculated by the operation in FIG. 10 using the numerical map in FIG. 9 which is based on a normal catalytic converter. Further, in this embodiment, the map similar to that in FIG. 9 is also prepared for a deteriorated catalytic converter. The temperature $DT_{cat}$ of a deteriorated catalytic converter is calculated by the operation in FIG. 10 using the map for the deteriorated catalytic converter. The upper limit $Q_H'$ of the intake air flow rate is determined from FIG. 5A using the temperature $T_{cat}$ for a normal catalytic converter. Further, the lower limit $Q_L'$ of the intake air flow rate is determined from FIG. 5B using the temperature $DT_{cat}$ for a deteriorated catalytic converter.

Since the upper limit $Q_H'$ and the lower limit $Q_L'$ are calculated separately based on the temperatures different from each other, the deterioration determining operation may be performed at the intake air flow rate larger than a true upper limit $Q_H'$ in the case where the catalytic converter has deteriorated, or the normal determining operation may be performed at the intake air flow rate smaller than a true lower limit $Q_L'$ in the case where the catalytic converter is normal.

First, the case is considered where the catalytic converter has deteriorated and the deterioration determining operation is performed at the intake air flow rate larger than the true upper limit $Q_H'$. Since the upper limit $Q_H'$ is the maximum intake air flow rate where a normal catalytic converter is never determined as having deteriorated, if the intake air flow rate is larger than the true upper limit $Q_H'$ there is the possibility that a normal catalytic converter is determined as having deteriorated. However, even in this case, a deteriorated catalytic converter is always determined as having deteriorated. Therefore, even if the deterioration determining operation is performed for a deteriorated catalytic converter at the intake air flow rate larger than the upper limit $Q_H'$ the error in the determination never occurs.

Next, the case is considered where the catalytic converter is normal and the normal determining operation is performed at the intake air flow rate smaller than the true lower limit $Q_L'$. In this case, though a deteriorated catalytic converter may be incorrectly determined as being normal, a normal catalytic converter is always determined as being normal in this flow range. Therefore, even if the normal determining operation is performed for a normal catalytic converter at the intake air flow rate smaller than the lower limit $Q_L'$, the error in the determination never occurs. Therefore, by determining the upper limit $Q_H'$ and the lower limit $Q_L'$ based on the temperature of the catalytic converter separately calculated, the range between the upper limit $Q_H'$ and the lower limit $Q_L'$ becomes wider, and the opportunity for performing the determining operation increases without lowering the accuracy of the determination.

Figure 16:
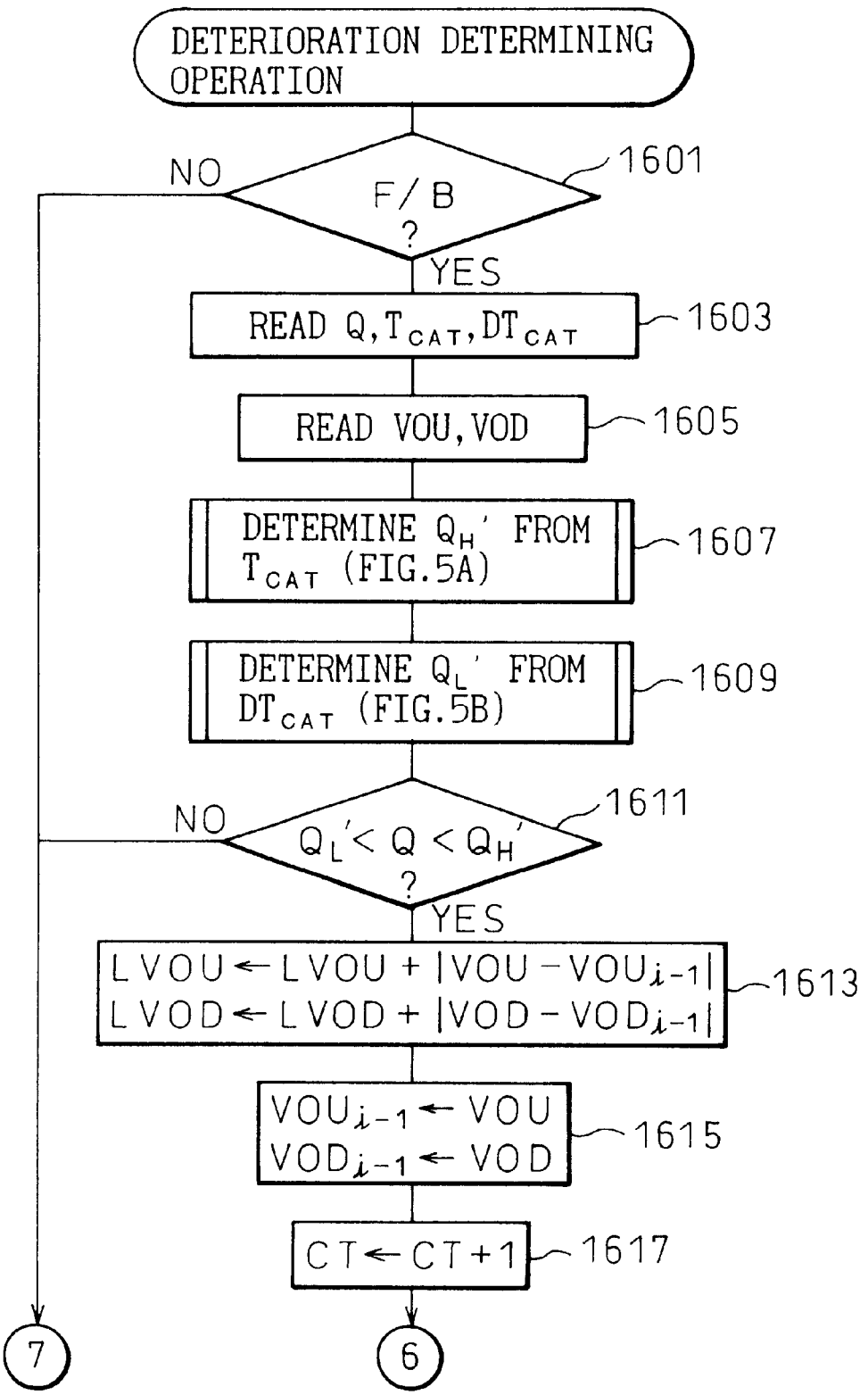
FIGS. 16 and 17 are a flowchart illustrating another embodiment of the operation for determining deterioration of the catalytic converter.
Figure 17:
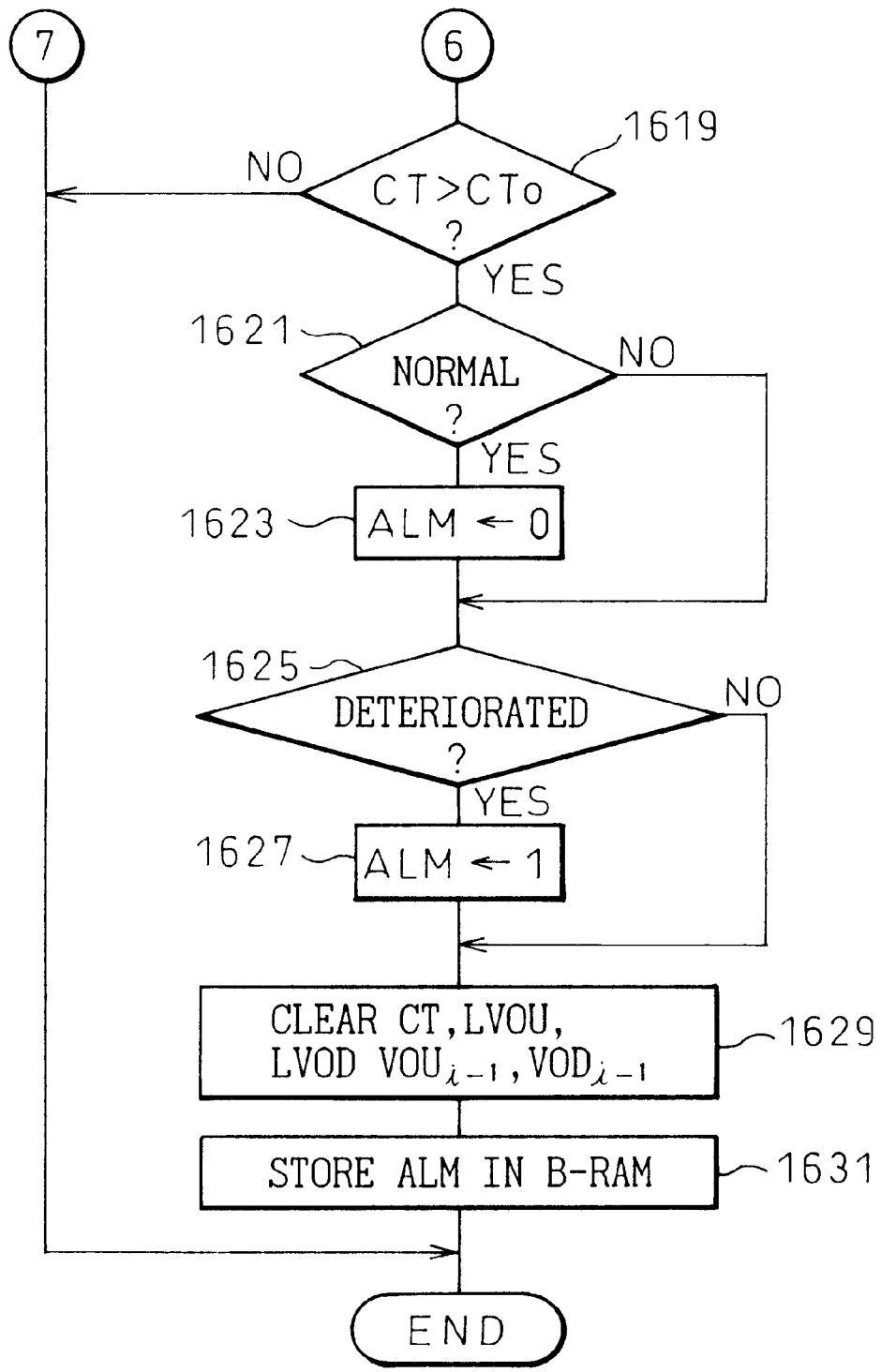

FIGS. 16 and 17 are a flowchart illustrating the operation for determining deterioration of the catalytic converter according to the present embodiment. This operation is performed by a routine executed by the control circuit 10 at regular intervals.

In FIG. 16, when the air-fuel ratio feedback control of the engine is being performed (step 1601), the current intake air flow rate Q is read in, and the temperature of a normal catalytic converter ("the normal temperature") $T_{cat}$ and the temperature of a deteriorated catalytic converter ("the deteriorated temperature") $DT_{cat}$ is read in at steps 1603 and 1605, respectively. The normal temperature $T_{cat}$ and the deteriorated temperature $DT_{cat}$ are calculated by the operations (FIG. 10) using the maps (FIG. 9) for a normal catalytic converter and a deteriorated catalytic converter. Further, the outputs VOU of the upstream air-fuel ratio sensor 13 and VOD of the downstream $O_2$ sensor 15 are fetched at step 1605.

At step 1607, the upper limit $Q_H'$ is determined from FIG. 5A using the normal temperature $T_{cat}$, and at step 1609, the lower limit $Q_L'$ is determined from FIG. 5B using the deteriorated temperature $DT_{cat}$.

At step 1611, it is determined whether the current intake air flow rate of the engine is between the upper limit $Q_H'$ and the lower limit $Q_L'$. In this embodiment, the determining operations are performed only when the current intake air flow rate Q is between the upper limit $Q_H'$ and the lower limit $Q_L'$. Namely, if $Q_L'<Q<Q_H'$ at step 1611, the lengths LVOU and LVOD of the output response curves of the upstream air-fuel ratio sensor 13 and the downstream $O_2$ sensor 15 are calculated by the steps 1613 through 1619. The steps 1613 through 1619 are the steps identical to steps 1413 through 1419 in FIG. 14.

When the predetermined time $CT_0$ has elapsed at step 1619, the normal determining operation is performed at step 1621, and the deterioration determining operation is performed at step 1625. These determining operations uses the criteria same as those in FIG. 6, and the value of the alarm flag ALM is set in accordance with the results of the determinations at steps 1623 and 1627. When the determination completes, the values of the parameters such as LVOU, LVOD are reset to 0, and the value of the flag ALM is stored in the backup RAM 106 before the operation terminates.

Though the determining operations are performed only when the current intake air flow rate is between the upper limit $Q_H'$ and the lower limit $Q_L'$ in the embodiment in FIGS. 16 and 17, the normal diagnosis condition and the deterioration diagnosis condition may be separately determined as explained in FIGS. 11 and 12 based on the normal temperature and the deteriorated temperature. Also in this case, the upper limit $Q_H'$ is determined using the normal temperature $T_{cat}$, and the lower limit $Q_L'$ is determined using the deteriorated temperature $DT_{cat}$.

I claim:

1. A device for determining deterioration of a catalytic converter having an $O_2$ storage capability and disposed in an exhaust gas passage of an engine comprising:

a downstream air-fuel ratio sensor disposed in the exhaust gas passage of the engine downstream of the catalytic converter for detecting the air-fuel ratio of the exhaust gas downstream of the catalytic converter;

air-fuel ratio control means for controlling an operating air-fuel ratio of the engine at a target air-fuel ratio;

condition determining means for determining whether one of a first and second condition for determining a state of the catalytic converter is satisfied when the air-fuel ratio control means controls the operating air-fuel ratio of the engine wherein the condition determining means separately determines whether the first and the second conditions are satisfied; and a determining means which determines the state of the catalytic converter when said first and second condition are satisfied, said determining means including a deterioration determining means for performing a deterioration determining operation based on an output of the downstream air-fuel ratio sensor when the first condition is satisfied and a normal determining means for performing a normal determining operation based on the output of the downstream air-fuel ratio sensor when the second condition is satisfied.

2. A device as set forth in claim 1, wherein the condition determining means comprises means for detecting the flow rate of intake air drawn into the engine and determines that:

(a) the first condition is satisfied when the flow rate of intake air is smaller than a predetermined upper limit value; and (b) the second condition is satisfied when the flow rate of intake air is larger than a predetermined lower limit value.

3. A device as set forth in claim 2, wherein the condition determining means further comprises means for detecting a temperature of the catalytic converter and sets at least one of the upper limit value and the lower limit value of the intake air flow rate in accordance with the detected temperature of the catalytic converter.

4. A device as set forth in claim 1, wherein the condition determining means comprises means for detecting the temperature of the catalytic converter and determines that:

(a) only the first condition is satisfied when the temperature of the catalytic converter is within a predetermined first temperature range;

(b) only the second condition is satisfied when the temperature of the catalytic converter is within a predetermined second temperature range; and (c) both of the first and the second conditions are satisfied when the temperature of the catalytic converter is within a predetermined third temperature range which lies between the first and the second temperature range.

5. A device for determining deterioration of a catalytic converter having an $O_2$ storage capability and disposed in an exhaust gas passage of an engine comprising:

a downstream air-fuel ratio sensor disposed in the exhaust gas passage of the engine downstream of the catalytic converter for detecting the air-fuel ratio of the exhaust gas downstream of the catalytic converter;

air-fuel ratio control means for controlling an operating air-fuel ratio of the engine at a target air-fuel ratio;

normal temperature estimating means for estimating a temperature of the catalytic converter, on an assumption that the catalytic converter is normal, based on an intake air flow rate of the engine;

deteriorated temperature estimating means for estimating a temperature of the catalytic converter, on an assumption that the catalytic converter has deteriorated, based on the intake air flow rate of the engine;

limit value setting means for setting an upper limit of the intake air flow rate in accordance with the temperature estimated by said normal temperature estimating means and for setting a lower limit of the intake air flow rate in accordance with the temperature estimated by said deteriorated temperature estimating means; and determining means for determining whether the catalytic converter has deteriorated based on an output of said downstream air-fuel ratio sensor when said air-fuel control means controls the operating air-fuel ratio of the engine and the flow rate of intake air drawn into the engine is between said upper and lower limits.

* * * * *